(12) United States Patent
Tucholski et al.

(10) Patent No.: US 8,722,235 B2
(45) Date of Patent: May 13, 2014

(54) THIN PRINTABLE FLEXIBLE ELECTROCHEMICAL CELL AND METHOD OF MAKING THE SAME

(75) Inventors: Gary R. Tucholski, North Royalton, OH (US); Ed T. Russell, Medina, OH (US); Dennis W. McComsey, Medina, OH (US)

(73) Assignee: Blue Spark Technologies, Inc., Westlake, OH (US)

( * ) Notice: Subject to any disclaimer, the term of this patent is extended or adjusted under 35 U.S.C. 154(b) by 2157 days.

(21) Appl. No.: 11/110,202

(22) Filed: Apr. 20, 2005

(65) Prior Publication Data

US 2005/0260492 A1 Nov. 24, 2005

Related U.S. Application Data

(60) Provisional application No. 60/563,953, filed on Apr. 21, 2004, provisional application No. 60/607,938, filed on Sep. 8, 2004, provisional application No. 60/632,913, filed on Dec. 3, 2004.

(51) Int. Cl.
*H01M 2/00* (2006.01)
*H01M 2/04* (2006.01)
*H01M 2/08* (2006.01)

(52) U.S. Cl.
USPC ............................ 429/176; 429/163; 429/185

(58) Field of Classification Search
CPC . H01M 2/0287; H01M 2/0267; H01M 2/026; H01M 2/0257; H01M 2/025; H01M 2/0202; H01M 2/02
USPC .................................. 429/122, 176, 163, 185

See application file for complete search history.

(56) References Cited

U.S. PATENT DOCUMENTS

| | | | |
|---|---|---|---|
| 629,325 | A | 7/1899 | Ashley |
| 629,372 | A | 7/1899 | Kennedy |
| 2,154,312 | A | 4/1939 | MacCallum |

(Continued)

FOREIGN PATENT DOCUMENTS

| DE | 19943961 A1 | 6/2000 |
|---|---|---|
| EP | 0678927 A1 | 10/1995 |

(Continued)

OTHER PUBLICATIONS

Linden, David; Handbook of Batteries and Fuel Cells; McGraw-Hill Book Company;1984; pp. 5-5 to 5-7.

(Continued)

*Primary Examiner* — Helen O Conley
(74) *Attorney, Agent, or Firm* — Pearne & Gordon LLP

(57) ABSTRACT

A thin printed flexible electrochemical cell with a high moisture and oxygen barrier polymer film sealed and folded package featuring a printed cathode deposited on a highly conductive carbon printed cathode collector with a zinc foil anode or printed anode placed adjacent to the cathode. After the cell components are added to the special laminated polymer substrate, the web is processed automatically on a modified high-speed commercial horizontal pouch filling machine to complete the cell assembly process. In this process a starch coated paper separator layer may be inserted over the anode and the cathode, and then the aqueous electrolyte solution is added to the cell. To complete the process, all four edges of the cell are heat sealed to confine the cell components within the cell cavity and each cell is trimmed off the continuous web.

66 Claims, 11 Drawing Sheets

(56) References Cited

U.S. PATENT DOCUMENTS

| | | | |
|---|---|---|---|
| 2,480,531 | A | 8/1949 | Wilke |
| 2,637,757 | A | 5/1953 | Wilke |
| 2,688,649 | A | 9/1954 | Bjorksten |
| 2,903,498 | A | 9/1959 | Sindel et al. |
| 2,905,738 | A | 9/1959 | Di Pasquale et al. |
| 3,006,980 | A | 10/1961 | Story |
| 3,230,115 | A | 1/1966 | Tamminen |
| 3,375,136 | A | 3/1968 | Biggar |
| 3,655,449 | A | 4/1972 | Yamamoto et al. |
| 3,770,504 | A | 11/1973 | Bergum |
| 3,799,808 | A * | 3/1974 | Hancock ............ 419/2 |
| 3,847,669 | A | 11/1974 | Paterniti |
| 3,901,732 | A | 8/1975 | Kalnoki Kis et al. |
| 3,928,077 | A | 12/1975 | Sperandio et al. |
| 3,954,506 | A | 5/1976 | Sullivan |
| 3,967,292 | A | 6/1976 | Delahunt |
| 3,980,497 | A | 9/1976 | Gillman et al. |
| 3,988,168 | A | 10/1976 | Bruneau |
| 3,993,508 | A | 11/1976 | Erlichman |
| 4,001,467 | A | 1/1977 | Sullivan |
| 4,006,036 | A | 2/1977 | Charkoudian |
| 4,007,472 | A | 2/1977 | Land |
| 4,028,479 | A | 6/1977 | Fanciullo et al. |
| 4,042,760 | A | 8/1977 | Land |
| 4,047,289 | A | 9/1977 | Wolff |
| 4,060,669 | A | 11/1977 | Fanciullo |
| 4,070,528 | A | 1/1978 | Bergum et al. |
| 4,080,728 | A | 3/1978 | Buckler |
| 4,086,399 | A | 4/1978 | Hyland et al. |
| 4,086,400 | A | 4/1978 | Hyland et al. |
| 4,098,965 | A | 7/1978 | Kinsman |
| 4,105,815 | A | 8/1978 | Buckler |
| 4,105,831 | A | 8/1978 | Plasse |
| 4,112,205 | A | 9/1978 | Charkoudian |
| 4,118,860 | A | 10/1978 | Buckler et al. |
| 4,119,770 | A | 10/1978 | Land |
| 4,124,742 | A | 11/1978 | Land et al. |
| 4,125,684 | A | 11/1978 | Land |
| 4,125,685 | A | 11/1978 | Bloom et al. |
| 4,125,686 | A | 11/1978 | Kinsman |
| 4,136,236 | A | 1/1979 | Ruetschi |
| 4,137,627 | A | 2/1979 | Kinsman |
| 4,145,485 | A | 3/1979 | Kinsman |
| 4,150,200 | A | 4/1979 | Sullivan |
| 4,152,825 | A | 5/1979 | Bruneau |
| 4,172,184 | A | 10/1979 | Bloom et al. |
| 4,172,319 | A | 10/1979 | Bloom et al. |
| 4,175,052 | A | 11/1979 | Norteman, Jr. |
| 4,177,330 | A | 12/1979 | Gordon et al. |
| 4,177,552 | A | 12/1979 | Gordon et al. |
| 4,181,778 | A | 1/1980 | Land |
| 4,185,144 | A | 1/1980 | Ames et al. |
| 4,194,061 | A | 3/1980 | Land et al. |
| 4,195,121 | A | 3/1980 | Peterson |
| 4,204,036 | A | 5/1980 | Cohen et al. |
| 4,232,099 | A | 11/1980 | Sullivan |
| 4,242,424 | A | 12/1980 | Buckler et al. |
| 4,254,191 | A | 3/1981 | Kniazzeh |
| 4,256,813 | A | 3/1981 | Kniazzeh |
| 4,287,274 | A | 9/1981 | Ibbotson et al. |
| 4,345,954 | A | 8/1982 | Panchu |
| 4,361,633 | A | 11/1982 | Nel et al. |
| 4,389,470 | A | 6/1983 | Plasse |
| 4,400,452 | A | 8/1983 | Bruder |
| 4,427,748 | A | 1/1984 | Land |
| 4,429,026 | A | 1/1984 | Bruder |
| 4,455,358 | A | 6/1984 | Graham et al. |
| 4,466,470 | A | 8/1984 | Bruder |
| 4,477,544 | A | 10/1984 | Bruder |
| 4,502,903 | A | 3/1985 | Bruder |
| 4,505,996 | A | 3/1985 | Simonton |
| 4,525,439 | A | 6/1985 | Simonton |
| 4,532,193 | A | 7/1985 | Kniazzeh et al. |
| 4,539,275 | A | 9/1985 | Plasse |
| 4,554,226 | A | 11/1985 | Simonton |
| 4,604,334 | A | 8/1986 | Tarascon |
| 4,608,279 | A | 8/1986 | Schumm, Jr. |
| 4,609,597 | A | 9/1986 | Plasse |
| 4,621,035 | A | 11/1986 | Bruder |
| 4,623,598 | A | 11/1986 | Waki et al. |
| 4,664,993 | A | 5/1987 | Sturgis et al. |
| 4,756,717 | A | 7/1988 | Sturgis et al. |
| 4,889,777 | A | 12/1989 | Akuto |
| 4,916,035 | A | 4/1990 | Yamashita et al. |
| 4,977,046 | A | 12/1990 | Bleszinski, Jr. et al. |
| 4,997,732 | A * | 3/1991 | Austin et al. ............ 429/153 |
| 5,035,965 | A | 7/1991 | Sangyoji et al. |
| 5,055,968 | A | 10/1991 | Nishi et al. |
| 5,110,696 | A | 5/1992 | Shokoohi et al. |
| 5,116,701 | A | 5/1992 | Kalisz |
| 5,120,785 | A | 6/1992 | Walker et al. |
| 5,217,828 | A | 6/1993 | Sangyoji et al. |
| 5,259,891 | A | 11/1993 | Matsuyama et al. |
| 5,326,652 | A * | 7/1994 | Lake ............ 429/127 |
| 5,330,860 | A | 7/1994 | Grot et al. |
| 5,338,625 | A | 8/1994 | Bates et al. |
| 5,350,645 | A | 9/1994 | Lake et al. |
| 5,401,590 | A | 3/1995 | Chalilpoyil et al. |
| 5,415,888 | A | 5/1995 | Banerjee et al. |
| 5,424,151 | A | 6/1995 | Koksbang et al. |
| 5,445,856 | A * | 8/1995 | Chaloner-Gill ............ 428/35.9 |
| 5,455,127 | A | 10/1995 | Olsen et al. |
| 5,470,357 | A | 11/1995 | Schmutz et al. |
| 5,514,492 | A | 5/1996 | Marincic et al. |
| 5,547,911 | A | 8/1996 | Grot |
| 5,565,143 | A | 10/1996 | Chan |
| 5,578,390 | A | 11/1996 | Hughen |
| 5,587,254 | A | 12/1996 | Kojima et al. |
| 5,620,580 | A | 4/1997 | Okabe et al. |
| 5,622,652 | A | 4/1997 | Kucherovsky et al. |
| 5,624,468 | A | 4/1997 | Lake |
| 5,637,418 | A | 6/1997 | Brown et al. |
| 5,652,043 | A | 7/1997 | Nitzan |
| 5,658,684 | A | 8/1997 | Lake |
| 5,728,181 | A | 3/1998 | Jung et al. |
| 5,735,912 | A | 4/1998 | Lake |
| 5,735,914 | A | 4/1998 | Lake |
| 5,747,190 | A | 5/1998 | Lake |
| 5,747,191 | A | 5/1998 | Lake |
| 5,759,215 | A | 6/1998 | Masuda |
| 5,779,839 | A | 7/1998 | Tuttle et al. |
| 5,811,204 | A | 9/1998 | Nitzan |
| 5,865,859 | A | 2/1999 | Lake |
| 5,897,522 | A | 4/1999 | Nitzan |
| 5,906,661 | A | 5/1999 | Lake |
| 5,930,023 | A | 7/1999 | Mitchell, Jr. et al. |
| 5,941,844 | A | 8/1999 | Eckenhoff |
| 6,025,089 | A | 2/2000 | Lake |
| 6,030,423 | A | 2/2000 | Lake |
| 6,030,721 | A | 2/2000 | Lake |
| 6,045,942 | A | 4/2000 | Miekka et al. |
| 6,078,842 | A | 6/2000 | Gross et al. |
| 6,084,380 | A | 7/2000 | Burton |
| RE36,843 | E | 8/2000 | Lake et al. |
| 6,136,468 | A | 10/2000 | Mitchell, Jr. et al. |
| 6,157,858 | A | 12/2000 | Gross et al. |
| 6,186,982 | B1 | 2/2001 | Gross et al. |
| 6,187,475 | B1 | 2/2001 | Oh et al. |
| 6,200,704 | B1 | 3/2001 | Katz et al. |
| 6,208,524 | B1 | 3/2001 | Tuttle |
| 6,235,422 | B1 | 5/2001 | Kaplan et al. |
| 6,243,192 | B1 | 6/2001 | Mitchell, Jr. et al. |
| 6,273,904 | B1 | 8/2001 | Chen et al. |
| 6,277,520 | B1 | 8/2001 | Moutsios et al. |
| 6,278,904 | B1 | 8/2001 | Chen et al. |
| 6,317,630 | B1 | 11/2001 | Gross et al. |
| 6,369,793 | B1 | 4/2002 | Parker |
| 6,379,835 | B1 * | 4/2002 | Kucherovsky et al. ....... 429/118 |
| 6,395,043 | B1 | 5/2002 | Shadle et al. |
| 6,421,561 | B1 | 7/2002 | Morris et al. |
| 6,458,234 | B1 | 10/2002 | Lake et al. |
| 6,503,658 | B1 | 1/2003 | Klein et al. |
| 6,569,572 | B1 | 5/2003 | Ochiai et al. |
| 6,576,364 | B1 | 6/2003 | Mitchell, Jr. et al. |

(56) References Cited

U.S. PATENT DOCUMENTS

| | | |
|---|---|---|
| 6,643,532 B2 | 11/2003 | Axelgaard |
| 6,653,014 B2 | 11/2003 | Anderson et al. |
| 6,664,006 B1 | 12/2003 | Munshi |
| 6,676,021 B1 | 1/2004 | Luski et al. |
| 6,676,714 B2 | 1/2004 | Langan |
| 6,697,694 B2 | 2/2004 | Mogensen |
| 6,708,050 B2 | 3/2004 | Carim |
| 6,709,778 B2 | 3/2004 | Johnson |
| 6,729,025 B2 | 5/2004 | Farrell et al. |
| 6,740,451 B2 | 5/2004 | Christian et al. |
| 6,743,546 B1 | 6/2004 | Kaneda et al. |
| 6,752,842 B2 | 6/2004 | Luski et al. |
| 6,757,560 B1 | 6/2004 | Fischer et al. |
| 6,816,125 B2 | 11/2004 | Kuhns et al. |
| 6,836,215 B1 | 12/2004 | Laurash et al. |
| 6,855,441 B1 | 2/2005 | Levanon |
| 6,884,546 B1 | 4/2005 | Fujita et al. |
| 6,888,502 B2 | 5/2005 | Beigel et al. |
| 6,899,976 B2 | 5/2005 | Larson et al. |
| 6,915,159 B1 | 7/2005 | Kuribayashi et al. |
| 7,017,822 B2 | 3/2006 | Aisenbrey |
| 7,022,431 B2 | 4/2006 | Shchori et al. |
| 7,031,768 B2 | 4/2006 | Anderson et al. |
| 7,043,297 B2 | 5/2006 | Keusch et al. |
| 7,049,962 B2 | 5/2006 | Atherton et al. |
| 7,224,280 B2 | 5/2007 | Ferguson et al. |
| RE39,676 E | 6/2007 | Nitzan |
| 7,238,196 B2 | 7/2007 | Wibaux |
| 7,244,326 B2 | 7/2007 | Craig et al. |
| 7,294,209 B2 | 11/2007 | Shakespeare |
| 7,320,845 B2 | 1/2008 | Zucker |
| 7,335,441 B2 | 2/2008 | Luski et al. |
| 7,340,297 B2 | 3/2008 | Tamarkin et al. |
| 7,340,310 B2 | 3/2008 | Nitzan et al. |
| 7,348,096 B2 | 3/2008 | Schubert et al. |
| 7,364,896 B2 | 4/2008 | Schembri |
| 7,368,191 B2 | 5/2008 | Andelman et al. |
| 7,383,083 B2 | 6/2008 | Fischer et al. |
| 7,394,382 B2 | 7/2008 | Nitzan et al. |
| 7,483,738 B2 | 1/2009 | Tamarkin et al. |
| 7,491,465 B2 | 2/2009 | Nitzan et al. |
| 7,501,208 B2 | 3/2009 | Feddrix et al. |
| 7,603,144 B2 | 10/2009 | Jenson et al. |
| 7,625,664 B2 | 12/2009 | Schubert et al. |
| 7,643,874 B2 | 1/2010 | Nitzan et al. |
| 7,652,188 B2 | 1/2010 | Levanon et al. |
| 7,727,290 B2 | 6/2010 | Zhang et al. |
| 2002/0086215 A1 | 7/2002 | Tamura et al. |
| 2002/0095780 A1 | 7/2002 | Shadle et al. |
| 2002/0110733 A1 | 8/2002 | Johnson |
| 2002/0182485 A1 | 12/2002 | Anderson et al. |
| 2002/0192542 A1 | 12/2002 | Luski et al. |
| 2003/0014014 A1 | 1/2003 | Nitzan |
| 2003/0059673 A1 | 3/2003 | Langan et al. |
| 2003/0082437 A1 | 5/2003 | Sotomura |
| 2003/0165744 A1* | 9/2003 | Schubert et al. .............. 429/303 |
| 2003/0187338 A1 | 10/2003 | Say et al. |
| 2003/0219648 A1 | 11/2003 | Zucker |
| 2003/0232248 A1 | 12/2003 | Iwamoto et al. |
| 2004/0001998 A1 | 1/2004 | Hopkins et al. |
| 2004/0009398 A1 | 1/2004 | Dorfman |
| 2004/0018422 A1 | 1/2004 | Islam et al. |
| 2004/0170893 A1 | 9/2004 | Nakaishi et al. |
| 2004/0209160 A1 | 10/2004 | Luski et al. |
| 2004/0217865 A1 | 11/2004 | Turner |
| 2004/0267189 A1 | 12/2004 | Mavor et al. |
| 2004/0267190 A1 | 12/2004 | Tamarkin et al. |
| 2004/0267283 A1 | 12/2004 | Mavor et al. |
| 2005/0013783 A1 | 1/2005 | Perricone |
| 2005/0038473 A1 | 2/2005 | Tamarkin et al. |
| 2005/0085751 A1 | 4/2005 | Daskal et al. |
| 2005/0147880 A1 | 7/2005 | Takahashi et al. |
| 2005/0194454 A1 | 9/2005 | Ferber et al. |
| 2006/0001528 A1 | 1/2006 | Nitzan et al. |
| 2006/0007049 A1 | 1/2006 | Nitzan et al. |
| 2006/0012464 A1 | 1/2006 | Nitzan et al. |
| 2006/0131616 A1 | 6/2006 | Devaney et al. |
| 2006/0159899 A1 | 7/2006 | Edwards et al. |
| 2006/0211936 A1 | 9/2006 | Hu et al. |
| 2006/0216586 A1 | 9/2006 | Tucholski |
| 2006/0253061 A1 | 11/2006 | Anderson et al. |
| 2006/0264804 A1 | 11/2006 | Karmon et al. |
| 2007/0007661 A1 | 1/2007 | Burgess et al. |
| 2007/0011870 A1 | 1/2007 | Lerch et al. |
| 2007/0016277 A1 | 1/2007 | Karat et al. |
| 2007/0024425 A1 | 2/2007 | Nitzan et al. |
| 2007/0060862 A1 | 3/2007 | Sun et al. |
| 2007/0066930 A1 | 3/2007 | Tanioka et al. |
| 2007/0243459 A1 | 10/2007 | Jenson et al. |
| 2008/0007409 A1 | 1/2008 | Ferry et al. |
| 2008/0021436 A1 | 1/2008 | Wolpert et al. |
| 2008/0091095 A1 | 4/2008 | Heller et al. |
| 2008/0174380 A1 | 7/2008 | Nitzan et al. |
| 2008/0218345 A1 | 9/2008 | Nitzan et al. |
| 2008/0272890 A1 | 11/2008 | Nitzan et al. |
| 2010/0209756 A1 | 8/2010 | Bailey et al. |

FOREIGN PATENT DOCUMENTS

| | | |
|---|---|---|
| EP | 0862227 A1 | 9/1998 |
| EP | 1026767 | 8/2000 |
| EP | 1096589 A1 | 5/2001 |
| EP | 1107336 A2 | 6/2001 |
| JP | 55-133770 A | 10/1980 |
| JP | 58-206048 A | 12/1983 |
| JP | 59-228353 A | 12/1984 |
| JP | S61-55866 A | 3/1986 |
| JP | 61-64077 A | 4/1986 |
| JP | 62-126557 A | 6/1987 |
| JP | 62-165875 A | 7/1987 |
| JP | 62-165876 A | 7/1987 |
| JP | 62-285954 A | 12/1987 |
| JP | 63-081762 | 4/1988 |
| JP | 63-119155 A | 5/1988 |
| JP | 64-24364 A | 1/1989 |
| JP | H02-273464 | 11/1990 |
| JP | H04-276665 | 10/1992 |
| JP | 5-217587 A | 8/1993 |
| JP | 5-225989 A | 9/1993 |
| JP | 5-275087 A | 10/1993 |
| JP | 2000-164033 A | 6/2000 |
| JP | 2000-229128 A | 8/2000 |
| JP | 2000-319381 A | 11/2000 |
| JP | 2001-23695 A | 1/2001 |
| JP | 2001-521676 A | 11/2001 |
| JP | 2003-151634 A | 5/2003 |
| JP | 2003-282148 A | 10/2003 |
| JP | 2004-336240 | 11/2004 |
| JP | 2005-39256 A | 2/2005 |
| TW | 540185 B | 7/2003 |
| WO | 96/38867 A1 | 12/1996 |
| WO | 97/17735 A1 | 5/1997 |
| WO | 98/22987 A2 | 5/1998 |
| WO | 98/48469 A1 | 10/1998 |
| WO | 00/36672 A1 | 6/2000 |
| WO | WO 03/069700 A2 | 8/2003 |
| WO | 2006/003648 A2 | 1/2006 |

OTHER PUBLICATIONS

Linden, David; Handbook of Batteries Second Edition; McGraw-Hill, Inc; 1995, pp. 8.8 to 8.9.
International Search Report and Written Opinion in PCT Application PCT/US08/87424, dated Aug. 6, 2009.
Acheson Industries, "Acheson Electrical Materials," from www.achesonindustries.com, dated Nov. 24, 2009.
Acheson Colloids Company, "Sales Information Bulletin," Port Huron, MI.
Advanced Coatings and Chemicals, "Technical Data Sheet," Temple City, CA.
International Search Report and Written Opinion issued Jan. 30, 2009 in PCT Application Serial No. PCT/US2008/071549.
Prosecution history for U.S. Appl. No. 11/378,520.

(56) References Cited

OTHER PUBLICATIONS

Prosecution history for U.S. Appl. No. 11/379,816.
Prosecution history for U.S. Appl. No. 12/669,067.
Prosecution history for U.S. Appl. No. 12/669,068.
Omnexus Adhesives & Sealant Solutions, "Ethylene Vinyl Acetate (EVA) and Other Hot Melts," from http://www.omnexus4adhesives.com/bc/construction-channel/index.aspx?id=ethylene.
Office action issued Jan. 16, 2011 in corresponding Israel Patent Application No. 178724.
Office action issued Dec. 14, 2011 in corresponding Japanese patent application No. 2007-509672.
Supplementary Partial European Search Report issued Apr. 20, 2012 in corresponding European Patent Application No. 05738396.0.
Hartman, Lauren R., "Flexibles stay resilient," Packaging Digest, Mar. 1, 2005.
Toppan Printing Co., Ltd., Product Data Sheet: Barrier Properties of GL, dated Oct. 4, 2001.
Toppan Printing Co., Ltd., Bulletin: Toppan's GL Family of Proprietary Environmental Barrier Films, last retrieved from http://www.toppan.co.jp/english/corporateinfo/r_and_d/bulletin/41/article4.html on Mar. 12, 2012.
Impak Corporation, Comparison of Barrier Film Properties, last retrieved from http://www.sorbentsystems.com/barrier_film_properties.htm on Oct. 8, 2013.
International Search Report and Written Opinion of the International Searching Authority in PCT Application PCT/US2008/070500, issued Dec. 31, 2008.

* cited by examiner

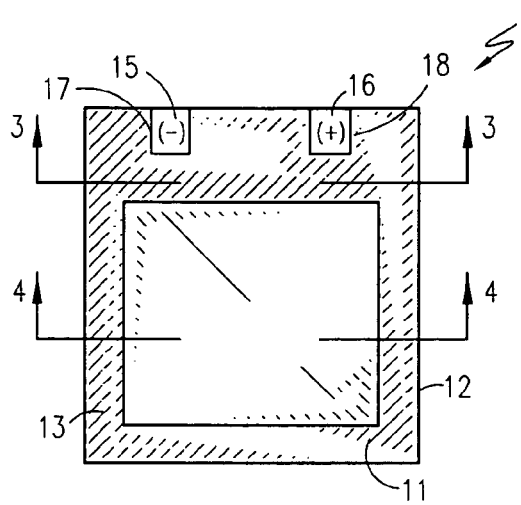
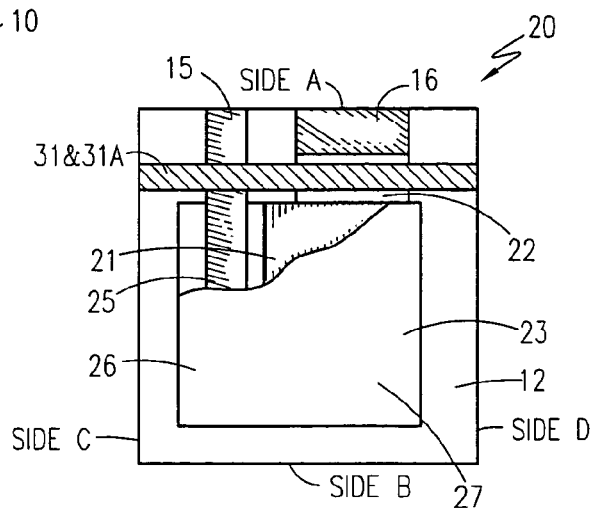
Fig. 1    Fig. 2
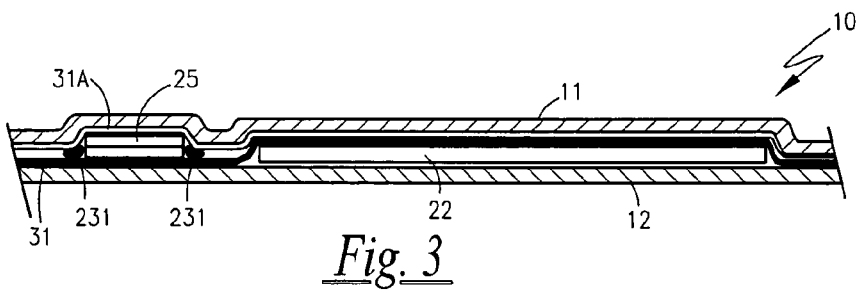
Fig. 3
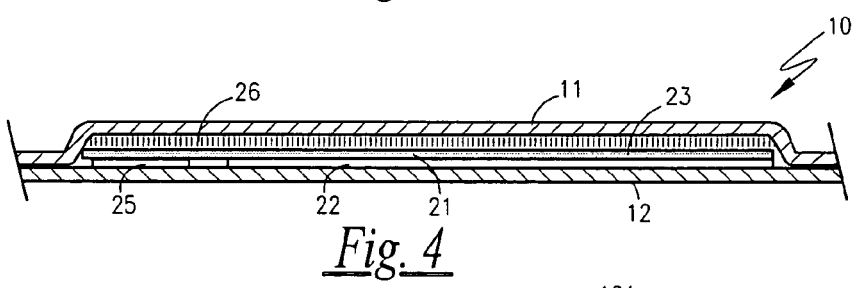
Fig. 4
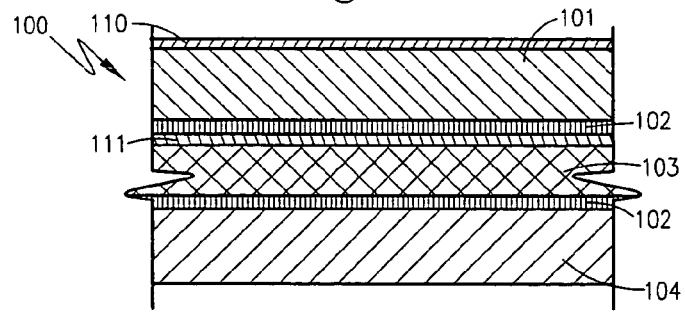
Fig. 5

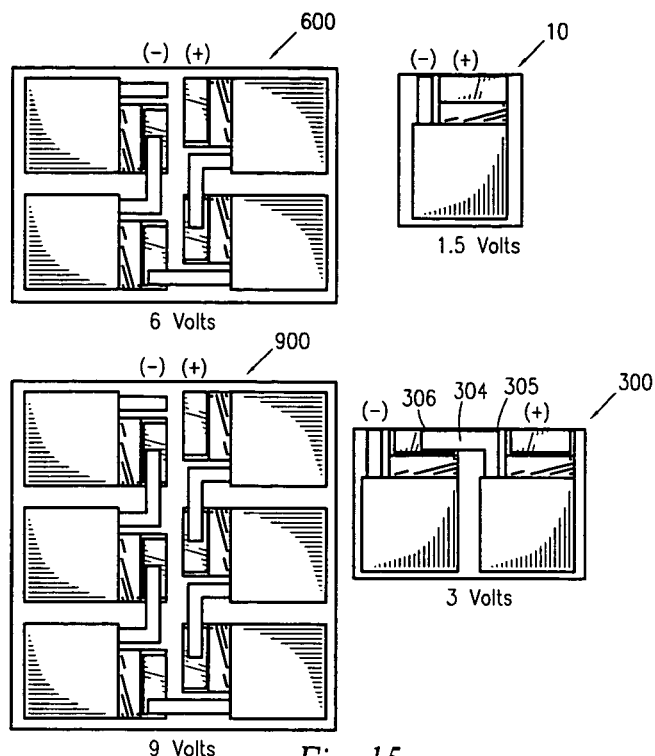
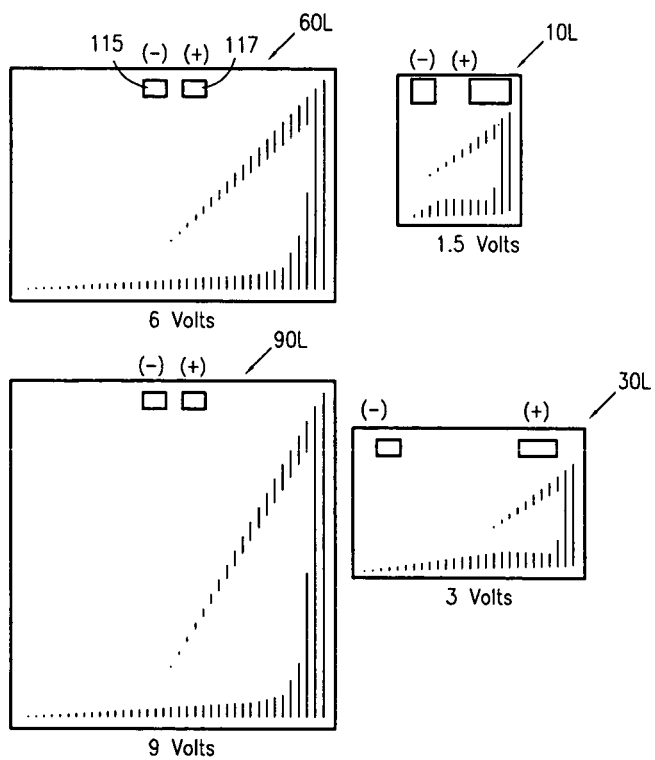

THIN PRINTABLE FLEXIBLE ELECTROCHEMICAL CELL AND METHOD OF MAKING THE SAME

CROSS-REFERENCES TO RELATED APPLICATIONS

This application claims the benefit of provisional patent applications 60/563,953, filed on Apr. 21, 2004, 60/607,938 filed on Sep. 8, 2004, and 60/632,913, filed on Dec. 3, 2004, all incorporated herein by reference.

BACKGROUND OF THE INVENTION

This application relates generally to a thin, printable cells and batteries and its manufacturing method. More specifically, this application relates to a thin, printed cell and battery manufactured using a pouch-filling process.

For the past one hundred years or so, scientists have been making Carbon/Zinc portable power sources for various applications. In the early days of portable power, these power sources were very large compared to today's standards. For example the very popular "Ignitor Cell" made by Eveready was about 3" diameter and about 9" tall was used in many applications such as radios, buzzers, Xmas lighting. These large cells as well as some smaller versions, such as the Eveready famous #6 (about 2" dia.×6" tall) and the smallest unit cell of the day, the #950 (D size) were commonly made into battery packs with voltages exceeding 40 volts in some applications. These were similar in size and larger than today's car batteries, for uses in lighting devices, radios and car ignition systems. In the mid 1900's with the advent of advanced electronics such as the transistor, the electrical requirements for portable power sources were reduced. Consequently cell sizes were also reduced to include C's, AA's, and AAA's and even small button cells. This power reduction has continued into the twenty first century where applications such as smart labels, smart credit cards, sensors, novelty devices such as greeting cards and badges now require a maximum current of several milliamperes with many applications requiring only a few microamperes at about 1.5-3.0 volts. These applications also have the requirement that the power sources be flat and very thin.

In the past twenty-five years, the approach to make thin flat cells/batteries was attempted by numerous scientists, corporations, and approaches. This includes the widely known battery developed by Polaroid. This six-volt battery pack was used in each package of Polaroid film. This allowed Polaroid to have a fresh battery in the camera each time the user placed a new roll of film in the camera. This high cost battery with multiple layers and a metal foil laminate package is a high voltage, high current battery, capable of igniting flash bulbs, and is not a competitor of the new thin low cost batteries that are now being developed. In addition to Polaroid, others have tried to develop thin batteries in various electrochemical systems.

Needed is a way to mass produce an economical, thin battery for use in modern, relatively low-power applications.

SUMMARY OF THE INVENTION

Provided is a battery including an electrochemical cell having a substrate with an inner surface; a first electrochemical layer covering some portion of the inner surface; a second electrochemical layer covering another portion of the inner surface and adjacent to the first electrochemical layer; an electrolyte layer substantially covering and in electrical contact with both the first electrochemical layer and the second electrochemical layer; and a covering layer covering the electrolyte layer and bound to the substrate to form a pouch for substantially to completely sealing the electrolyte layer in an interior of the cell.

Also provided is a battery including an electrochemical cell comprising a substrate including a multi-layer laminate and having: an outer surface, and an inner surface.

The substrate forms a fold over itself, such that the inner surface forms a first inner side and a second inner side on opposite sides of an interior of the cell, and the outer surface defines a first outer side and a second outer side on opposite sides of the exterior of the battery cell.

The cell further comprising collector layer, including a first cured and/or dried conductive ink, at least partially covering the first inner side; a first electrochemical layer, including a second cured and/or dried ink, at least partially covering the collector layer; a second electrochemical layer on one of the first inner side and the second inner side; an electrolyte layer, including an electrolyte soaked in an absorbent material, in contact with both the first electrochemical layer and the second electrochemical layer and between the first inner side and the second inner side; and a connecting and/or sealing layer for connecting a portion of an outer perimeter of the first inner side to a portion of an outer perimeter of the second inner side to bind the first inner side to the second inner side for holding the substrate in the folded position, thereby forming a pouch for containing the electrolyte in the interior of the cell.

Still further provided is a method for manufacturing a thin battery including an electrochemical cell, the method comprising the steps of:

providing a web of a multi-layer laminate substrate;
punching or cutting a cutout from the substrate
printing a conductive ink layer on an inner surface of the web;
printing a first electrochemical layer, including an ink, over some portion of the conductive ink layer;
applying a second electrochemical layer on the substrate;
applying a sealing layer on some part of the substrate;
folding the substrate to form a pouch, such that the sealing layer attaches an inside of a first portion of the substrate to an inside of a second portion of the substrate, such that the first electrochemical layer, the second electrochemical layer, and the absorbent layer are captured within the pouch between the insides of the first and second portions, wherein the folding step forms an opening to the interior of the pouch;
adding an electrolyte through the opening;
sealing the opening to substantially or completely seal the electrolyte within the interior of the pouch; and
cutting the substrate to provide one or more of the electrochemical cells into the battery, wherein
electrical access to one or both of the first electrochemical layer and the second electrochemical layer is provided through the cutout.

Also provided is the above method, further comprising the step of providing an absorbent layer for contacting a portion of both the first electrochemical layer and the second electrochemical layer, wherein, during or subsequent to the adding an electrolyte step, at least a portion of the electrolyte is absorbed by the absorbent layer.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 1 shows a plan view of a unit cell.

FIG. 2 shows a plan view cutaway of a unit cell prior to placing the upper laminate.

FIG. 3 is a cross section view of the printed cell taken through a seal area (line "3-3") in FIG. 1.

FIG. 4 is a cross section view of the printed cell taken through the cell center (line "4-4") in FIG. 1.

FIG. 5 is a cross section view of the laminated film layers of a preferred construction.

FIG. 6a shows a modified geometry for application of adhesive to seal the thin electrochemical cell of the invention, herein termed a "picture frame," to improve seal effectiveness.

FIGS. 6b and 6c show further alternative modes of construction for a thin printable cell according to the present invention.

FIG. 15 shows 4 different battery constructions using unit cells without a top laminates and/or labels.

FIG. 16 shows 4 different battery constructions using unit cells with top laminates and/or labels.

DETAILED DESCRIPTION OF THE PREFERRED EMBODIMENTS

Figure 6:
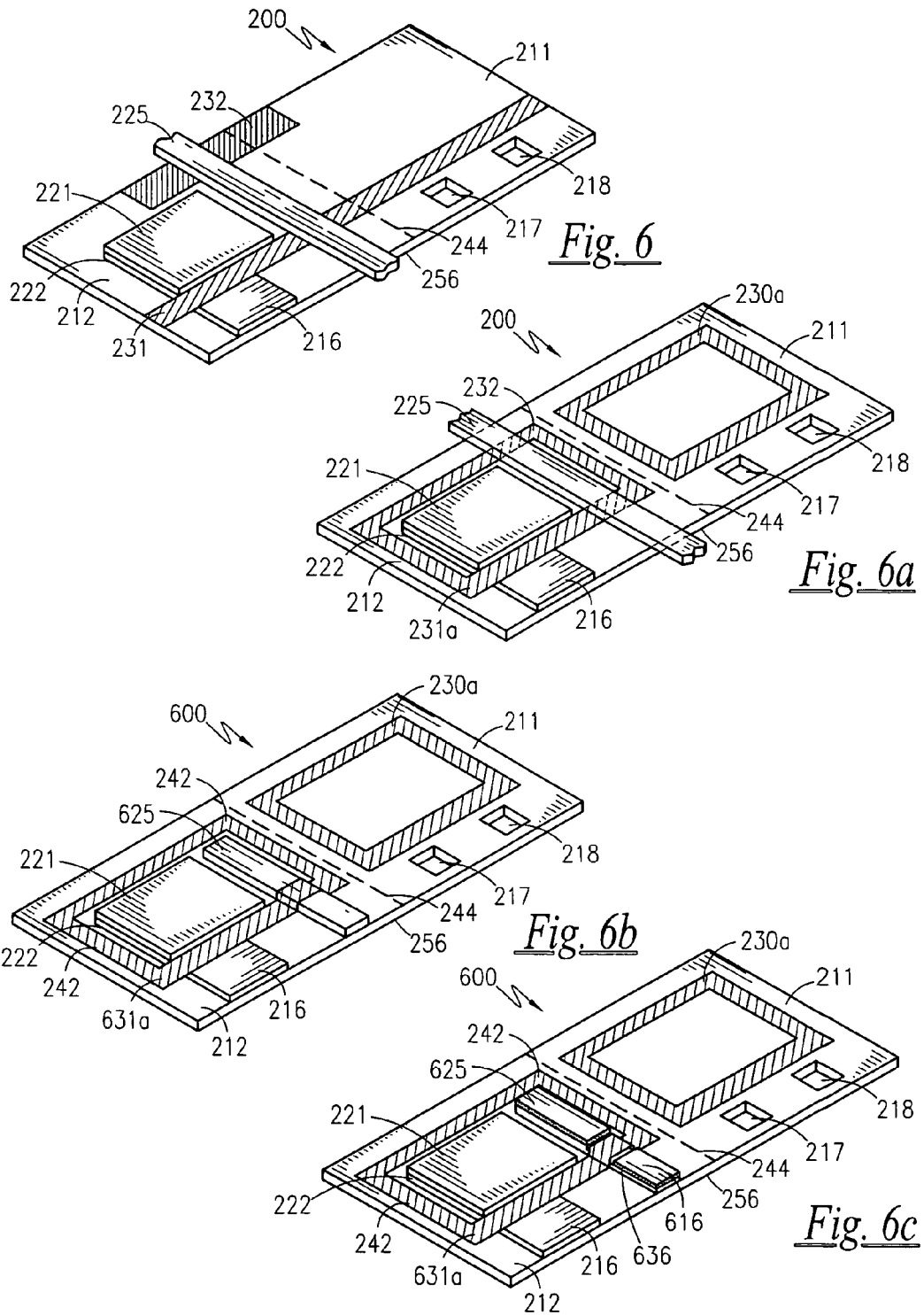
FIG. 6 shows a modified unit cell construction to allow for high speed low cost production.

As used herein, unless otherwise explicitly indicated, all percentages are percentages by weight. As used herein, when a range is given, such as "5-25", for example, this means preferably at least 5 and, separately and independently, preferably not more than 25. Also herein, a parenthetical range following a listed or preferred value indicates a broadly preferred or less preferred range for that value according to the invention.

The present invention relates to thin printed electrochemical cells and/or batteries. More specifically, this invention relates to a thin printable cell that contains two electrodes, separator, and electrolyte between two laminated film layers.

One method of mass-producing such a cell includes depositing aqueous and/or non-aqueous solvent inks or coatings in a pattern on a special laminated polymeric film layer by means of printing and/or laminating a metallic foil on high speed web printing presses, particularly if the required volumes are very high. If volumes are lower, say in the quantities of only about several million or less, then slower methods such as web printing with flat bed screens would be appropriate as well. If the volumes are extremely low, such as in the hundreds or thousands, then a sheet fed flat bed printing press may be appropriate. After all of the inks are printed and all of the solids have been properly placed and a web is used, the cells are assembled automatically on high-speed commercial pouch filling machines (Horizontal and/or vertical). When the production volumes are low and the cell components are placed on sheets, the cells are hand assembled with or without machine assistance.

With the growing market needs for low cost, low capacity thin flat cells, it has been found possible to produce a thin, at least partly printable flexible cell that is versatile and inexpensive to mass-produce. Printed disposable thin cells can be well suited for low power and high production volume applications, for example, because they offer adequate voltage, sufficient capacity, and low-cost solutions. In one embodiment, the batteries disclosed herein include all of these attributes, whereas the conventional low profiled batteries may contain only a few of these attributes.

The electrochemical cell/battery according to the invention has the following advantages:

Thin;
Flat;
Flexible;
Sealed container;
Simple construction;
Designed for high speed and high volume production;
Low cost;
Reliable performance at all temperatures;
Good low temperature performance;
Disposable and environmentally friendly;
Both cell contacts are on the same surface;
Ease of assembly into application; and/or
Capable of being manufactured integrated in a continuous process at the same time as the application is being made A typical cell has two electrodes (i.e., anode and cathode) and an electrolyte. The electrodes are comprised of electrochemical materials that interact with the chemicals in an electrolyte to generate a voltage across the electrodes, thus providing a current to an electric circuit.

In its most generalized form, a cell/battery according to the invention is comprised of a substrate having an inner and an outer surface. A first electrochemical layer representing one electrode is applied to some portion of said inner surface, such as by printing or laminating, for example. The first electrochemical layer could be a cathode electrode layer or an anode electrode layer, for example.

If the first electrochemical layer has a relatively low conductivity, it can be printed or laminated on top of a cathode or anode collector layer, in order to improve its conductivity. The collector layer could, for example, be directly printed or laminated onto the inner surface of the substrate. The electrochemical layer may then cover all, or only a portion, of the collector layer, if the collector layer is used.

A second electrochemical layer (representing the other electrode) covering another portion of the inner surface, and adjacent to, or across from, the first electrochemical layer, is also provided. This second electrochemical layer is the other of the anode or cathode electrodes, so that the cell has both an anode and a cathode electrochemical layer, as necessary for interacting with the chemical electrolyte for the cell to provide a voltage across the electrochemical layers (the electrodes) and thus provide an electrical current to an electrical circuit. For this second electrochemical layer as well, if the conductivity of the second electrochemical layer is low, it could be printed or applied over a corresponding collector layer for improving total conductivity.

A separator of various types of materials including papers, coated papers, matted and or woven polymers, and combinations of the former is disposed over the top of the two electrodes. This material absorbs a portion of the electrolyte and improves the contact and wetting of the electrodes with the electrolyte thus reducing the internal resistance of the cell./battery.

Thus, the electrolyte layer is substantially covering or otherwise in physical electrical contact with both said first electrochemical layer and said second electrochemical layer to complete the battery cell electrochemical process and thus power the electrical circuit.

A covering layer is provided for covering the separator/electrolyte layer. The covering layer is bound to the lower substrate to subsantially or completely seal the cell and prevent leakage of the electrolyte. The covering layer could be, for example, a part of the substrate, which could then be continuous piece. In that case, the electrochemical layers could both be placed on the same inner side the substrate. The substrate would then be folded, forming a covering layer as well, such that the inner surfaces of the substrate face each other, and, using a sealing layer, substantially or completely sealing the internal components of the cell described above.

Alternatively, one of the first and second electrochemical layers (and the corresponding collector layer, if present) could be placed on the inner surface of the covering layer, thus putting the first and second electrochemical layers opposite each other. Such a construction would likely use a separator layer to separate and isolate the electrodes.

A number of embodiments specifically implementing the above generalized cell are provided below, along with variations on the above described cell design.

The invention in one embodiment is a thin, printed cell that includes a lower film layer of a special polymer laminate that has special features that can include a heat sealing layer on the inside, (heat sealing on the outside surface is also possible depending on the cell/battery construction), a high moisture barrier layer in the center of the laminate, a structural film on the outside of the laminate, with both interior and exterior surfaces made to be print receptive and extending beyond the internal components. A portion of the inner surface of the lower film layer preferably has a cathode current collector, comprising carbon, printed or coated, on a portion of the film. At the outside contact area of this collector is printed a highly conductive ink comprising silver, nickel, or tin, for example, to improve the conductivity to the application connection. If the battery application is for very low currents, then the higher conductive material may not be required, whereas it is desirable for higher currents.

In some embodiments, printed on the cathode current collector is a water-based cathode ink that includes manganese dioxide ($MnO_2$), carbon, and a polymer binder. For some embodiments adjacent to the cathode collector, at a spacing of about 0.050", a narrow strip of zinc foil anode is placed. Prior to this placement, the zinc foil is laminated to a dry film adhesive that includes a release liner. Inserted over both electrodes is a paper separator layer that is starch coated on one side. Once the separator is in place, an aqueous electrolyte solution is added to the cell. In many embodiments, zinc chloride ($ZnCl_2$) is the preferred electrolyte choice in the concentration range of 18%-45% by weight. Other embodiments use electrolytes such as ammonium chloride ($NH_4Cl$), mixtures of zinc chloride ($ZnCl_2$) and ammonium chloride ($NH_4Cl$), zinc acetate ($Zn(C_2H_2O_2)$), zinc bromide ($ZnBr_2$), zinc fluoride ($ZnF_2$), zinc Iodide ($ZnI_2$), zinc tartrate ($ZnC_4H_4O_6.H_2O$), zinc per-chlorate $Zn(ClO_4)2.6H_2O$), potassium hydroxide KOH, sodium hydroxide NaOH, or organic compounds could also be used.

Zinc chloride is often the electrolyte of choice, providing excellent electrical performance for ordinary environmental conditions normally encountered. Likewise, any of the above mentioned electrolytes may be used in concentrations (by weight) within the range of 18%-50%, for example, with the preferred range often being of 25%-45%, to provide acceptable performance under ordinary environmental conditions. The use of electrolytes other than that of zinc chloride can provide improved cell/battery electrical performance under differing environmental conditions, as desired.

For example, 32% by weight of zinc acetate (F.P.—freezing point—of −28° C.) exhibits a lower freezing point than 32% by weight zinc chloride (F.P.—23° C.), and thus could be preferable for colder applications. Both of these solutions exhibit lower freezing point than the industry standard 27% zinc chloride (F.P.—18° C.). Other zinc acetate concentrations (e.g. 18-45 or 25-30 weight percent) can also exhibit reduced freezing point relative to the industry standard −18° C. Use of such electrolytes as substitutes for zinc chloride or in various mixtures in cells/batteries allows for improved performance at lower temperatures.

For example, it has been found that the use of an about 30% zinc acetate electrolyte substantially improves low temperature (i.e. below −20° C.) performance of a voltaic cell. To illustrate, data are reported in the table below from an experiment comparing cells having the typical 27% zinc chloride electrolyte with the novel 30% zinc acetate electrolyte:

| Electrolyte Solute | Closed Circuit Voltage (CCV) after 10 second Discharge on 6500-Ohm Load | | | | |
|---|---|---|---|---|---|
| | CCV @ 21° C. | CCV @ −18° C. | CCV @ −23° C. | CCV @ −27° C. | CCV @ −29° C. |
| 27% zinc chloride (FP −22° C.) | 1.588 | 1.423 | 1.261 | 1.114 | negligible |
| 30% Zinc Acetate (FP −34° C.) | 1.572 | 1.360 | 1.318 | 1.307 | 1.262 |

The experiment was conducted using a ten second-pulse load of 6500 ohms at the various temperatures given in the table above. The closed circuit voltage was measured under load at the end of the pulse. From the above table data, it can be seen that at −23° C., a voltage improvement of 4.5% is achieved using the zinc acetate solute compared to the zinc chloride solution. The improvement is over 17% just four degrees cooler at −27° C., and at −29° C. the zinc acetate cell exhibited 1.262 volts whereas the zinc chloride cell exhibited zero or a near zero negligible voltage. This is a substantial degree of improvement in low temperature performance compared to conventional electrolytes.

This type of electrochemical cell performance improvement at low temperature can be useful in the growing business of battery assisted RFID tags and other transient (transportable) electrically operated devices such as smart active labels and temperature tags, because many products that are shipped today, such as food products pharmaceuticals, blood products, etc, require low temperature storage and shipping conditions, thus tracking these items with such tags and/or labels requires electrochemical cells and/or batteries to operate effectively at temperatures at or below −20° C., preferably −23° C., preferably −27° C., preferably −29° C. When zinc acetate is used to achieve improved low temperature performance for low temperature applications, preferably the zinc acetate concentration is in the range of 28-30, less preferably 30-34, less preferably 25-28, weight percent, as additional examples.

Another method of enhancing low temperature performance and processability is through the addition of polymeric thickeners or gels to the electrolyte. Through the use of these materials, the freezing point of the electrolyte can be reduced from the −18° C. to −30° C. Improvement of the low temperature performance of the cell is then enhanced using the preferred zinc chloride electrolyte. The preferred material is carboxymethylcellulose in the amount of about 0.6% with a range of about 0.01%-1.2% of the total electrolyte by weight. Alternate classes of thickeners may also be used. These may be from the same class of materials as the cathode binders. Other less preferred classes of materials include the following: polyvinyl alcohol, classes of starches and modified starches including rice, potato, corn, and bean varieties; ethyl and hydroxyl-ethyl celluloses; methyl celluloses; polyethylene oxides; polyacryamides; as well as mixtures of the above materials.

In many embodiments, the electrolyte-separator layer is disposed to ensure complete physical and ionic contact with the anode and the cathode in the assembled cell, which is often desirable.

The upper layer of the cell package can be comprised of a special laminated polymeric film, which has an edge that extends beyond the internal cell/battery components. The upper layer of this film is sealed around its edges to the lower film layer by means of heat sealing, or with some type of adhesive, thus confining the internal components within the cell cavity. The above was a general description of some preferred cell constructions according to the invention, and further details follow below. A useful example production process for cell printing and assembly also will be described with respect to FIGS. 6-14.

The wet cell construction described herein is likely to be the preferred construction for many embodiments; however, using a similar cell construction, the present invention could be also be manufactured using a reserve cell construction, which has the benefit of providing extended shelf life prior to the application of a liquid, for example.

The preferred printable, flexible, zinc chloride thin cell can be made environmentally friendly. This construction does not typically require the use of components such as mercury or cadmium. Old and/or depleted cells can thus typically be disposed in regular waste removal procedures, rather than requiring special disposal procedures as required for many battery designs.

Furthermore, the devices for which this technology can be used are extensive. A device that requires, for example, relatively low power or a limited life of one to three years, for example, may function with a thin cell/battery according to the invention. The cell as explained herein can be relatively inexpensively mass-produced allowing use as or in a disposable product. The low cost allows for applications that previously may not have been cost effective.

Battery Cell Structures

FIGS. 1 thru 4 show various views of a printed unit cell in plan and sectional views for a first embodiment of the invention. Completed cell 10 includes a substrate having a lower laminated film layer 12, an upper laminated film layer 11, with cutout areas 17 and 18. Cutout area 17 allows external contact to the cell negative contact 15 while cutout area 18 allows for the external contact to cells positive contact 16. A cathode collector layer 22 of highly conductive carbon is printed on an inner portion of the lower laminated layer 12 to improve conductivity of the cathode electrochemical layer 21. This collector has the combined shape and size of that of the cathode layer 21, the collector 22 and the contact 16.

The unfinished cell 20 (without top laminate 11 of FIG. 2 and the finished cell 10 shows a cathode electrochemical layer 21 (cathode electrode) and an anode electrochemical layer 25 (anode electrode) with a paper separator layer 23 in physical contact with the electrodes 21 and 25. To facilitate good ionic contact with separator layer 23 and electrochemical layers 21 and 25, aqueous zinc chloride electrolyte 26 is added to the paper separator 23 to form a paper separator electrolyte layer 27.

To assist in sealing the contacts through the seal areas, a strip of double sided dry film adhesive 31 is applied across the cell seal area prior to the disposition of anode electrochemical layer 25. After the anode layer 25 is disposed, another layer or strip of double sided dry film adhesive 31a is applied. These adhesive layers, when activated with a heat sealing process, allows the inner portions of both upper 11 and lower 12 laminate films to adhere to both collectors in the seal areas as well as fill a gap 231 that is formed due to the anode 25 height relative to the lower laminate 12.

The inner portions of the lower and upper laminated films 12 and 11 respectively are heat sealed together as shown by the shaded area to form the cell seal 13. In the preferred construction the upper laminate 11 and lower laminate 12 are the same materials. They are the same for several reasons which are: similar materials are more compatible for heat sealing, similar high moisture barrier materials allows for good moisture protection for the entire cell, and finally this allows the package to be made with a folded substrate that will be discussed later. This allows the unit cells to be assembled on a high speed pouch filling machine which will be discussed later in this description. Although the same material is highly preferred for performance and assembly, there may be situations where the top and lower cell container layers may be of different materials.

In the first embodiment, the laminated film is supplied by Curwood Inc. of Oshkosh, Wis. and is shown in the cross section drawing of FIG. 5. This laminated film 100 comprises five layers. The top layer 101 is on the inside of the cell and has a total thickness of about 0.5 mil (0.1-5.0 mils). This composite layer has a heat sealing coating 110 such as amorphous polyester (APET or PETG) semicrystalline polyester (CPET) polyvinyl chloride (PVC), or a polyolefin polymer etc. on a polymer film such as polyester. One such material is the Ovenable Lidding (OL) film made by Dupont and designated as their OL series such as the preferred material OL 2, OL 12 or OL 13.

This composite layer 101 is laminated to a 0.48 mil thick (0.2-5.0 mil) high moisture barrier polymer layer 103 such as the GL films supplied by Toppan of Japan by means of a 0.10 mil (0.1-2.0 mil thick) layer of Urethane adhesive 102. These polymer (polyester) based films have varying moisture transmission values depending on the type and the amount of vacuum deposited oxides or metals coatings 111.

Depending on the cell construction, the cell application, and/or the cell environment, it may be advantageous to have different barrier properties for the substrate. Due to the wide range of vapor transmission rates available, the barrier layer can be chosen for each specific application and construction.

In some cases, where the cell by design has a higher gassing rate, then it may be appropriate and desirable to use a film with a higher transmission rate to allow for a larger amount of gas to escape so as to minimize cell bulging. Another example would be an application that is in a hot dry environment such as a desert. In that case, it would be desirable to have a barrier film with low transmission rates to prevent excessive moisture loss from the cell.

The outside layer or structural layer 104 of this five layer laminate 100 is of about a 2.0 mil (0.5-10.0 mil) layer of orientated polyester (OPET) which is laminated to the other layers by means of an urethane adhesive 102 that is about 0.1 mil thick. This "structural layer" can be a Dupont polyester orientated (OPET) film. The preferred material is from Toyobo Co. Ltd. of Japan. This material is polyester based synthetic paper which is designated as a white microvoided orientated polyester (WMVOPET). This layer 104 would then form the outer surface of the substrate 100 in its typically application to the invention.

The use of a thicker substrate by increasing any or all of the polymer thicknesses has some advantages: These may include one or more of the following:

- The web is easier to process in the various printing operations
- The cells process better in the automatic cell assembly machine which as described later is horizontal pouch filler;
- The cell package is stiffer and stronger; and
- The amount of entrapped air in the assembly process is reduced. Even though the thickness of the materials is increased, the total cell thickness after assembly is less than that increase.

In addition to the above specifications, both the outside and the inside layers could be made with a print receptive surfaces for the required inks. The inside layer is for receiving the functional inks while the outside layer is for receiving graphic inks for identification or advertising purposes, for example.

In most flat cell constructions with a sealed system, the package consists of a laminated structure that contains metallized films and/or very thin metal foil for the moisture barrier. Although this structure with the metal layer may have better moisture barrier properties than the one described herein without the metal layer, it also has some disadvantages. These include:

- Laminated structures with metal barriers (thin metal foil or a vacuum metallized layer) could be more expensive;
- Laminated structures with metal layers have the possibility of causing internal short circuits in the cell; and
- Laminated structures that contain a metal barrier could interfere with the electronics of the application such as the functionality of an antenna, for example.

The film layers 11 and 12 of FIGS. 1 and 2 can be of numerous variations of polymeric film with or without a barrier (metal or other materials), either mono-layer or multi-layer films, such as polyesters or polyolefins. Polyester is preferred for many purposes because it provides improved strength permitting use of thinner gauge film and is not easily stretched when used on a multi-station printing press. Vinyls, cellophanes, and even paper can also be used as the film layers or one of the layers in a laminated construction.

If a very long shelf life and/or the environmental conditions are extreme, the polymer of FIG. 5 could be modified to include a metallized layer 111 such as obtained by vacuum deposition of aluminum or very thin aluminum foil. This modification could reduce the present low water loss to practically nil. On the other hand, if the application is for a shorter shelf life and/or short operating life, the more expensive barrier layer could be replaced with a less efficient layer which would be a lower cost and still allow the cell to function as required. In applications where only an extremely short life is required, the cell package could use a low cost polymer substrate such as polyester or polyolefin with or without a heat sealing layer on the inside.

The substrate could also be optimized into a three-layer laminate by combining the barrier layer with the structural layer. This could be done by depositing the barrier coating directly onto the thicker structural layer and then laminating this to the heat-seal layer. Another means of reducing the number of layers would be to apply the heat seal layer on either the barrier layer and/or on the structural layer, and then laminating this structure to the other material. Thus, in one case the barrier coating is applied to the structural layer, but in the other case the heat sealing layer is applied directly to the structural layer. Both of these structures would result in a three-ply laminate. The total thickness of this three-ply laminate would be about 0.003" with a range of about 0.001-0.015".

The cell materials for one of the preferred embodiments of cell construction, as shown in FIGS. 1-4, are comprised of the following materials. The cathode collector 22 uses a highly conductive carbon ink (PM024) and is manufactured by Acheson Colloids of Port Huron, Mich. It is printed on the inside surface of the lower laminate by means of screen printing using a very coarse screen of about 61 mesh (20-180 mesh) to allow for a dry deposit of about 1 mil (1.2-0.4 mils respectively) and a resistance of about 55 ohms (44-100 ohms).

To further reduce the above resistance, a highly conductive contact 16 is printed at the external contact area of the positive electrode. The material used in the preferred construction is a silver filled conductive ink (479SS) manufactured by Acheson Colloids of Port Huron, Mich. and is screen printed. Other, conductive materials such as gold, tin, copper, nickel and/or mixtures of two or more conductive materials could also be used where desirable. All of these conductive inks could be applied by means of printing methods such as rotary screen, flexography, and gravure as well as with ink jet printing techniques. Additionally, manufactured foils of graphite or mixtures of conductive resins, metals or graphite could be inserted and used instead of printing the cathode collector.

The cathode electrochemical layer 21 is printed on a portion of the previously printed and dried cathode collector 22 using an aqueous based ink that has a wet composition of about 43.4% of battery grade Manganese Dioxide (20%-60%), about 14.4% of KS-6 graphite (2%-25%), about 29.5% of a 6.5% (0.5%-15%) aqueous solution of polyvinylpyrrolidone (PVP) (20%-60%); and about 9.65% of De-ionized or distilled water (0.1%-20%). This ink is printed with an about 46 mesh (10-65 mesh) fiberglass screen so as to allow a dry lay down weight of about 0.10 grams per square inch (0.03-0.25 g/sq. in.). The amount of dry print would be dictated by the required cell capacity, with larger capacity requiring more material. By using this unconventional printing method of a very coarse mesh screen instead of multiple hits of a finer mesh screen, the number of printing stations can be reduced and the cell performance can be increased.

The electro-active cathode electrochemical layer (21) material used in the preferred construction is an electrolytic manganese dioxide of high purity battery grade. The material particle size range is about 1 to 100 microns with an average of about 40 microns. If additional fineness of the material is required to facilitate the application to the collector, the material is milled to achieve a particle size range of about 1 to 20 microns with an average of about 4 microns.

Other less preferred electro-active cathode materials may be used in conjunction with the zinc anode in the subject construction. These are, silver oxides $Ag_2O$ and AgO, mercuric oxide HgO, nickel oxide NiOOH, oxygen $O_2$ as in the form of an air cell, Vanadium oxide $VO_2$. Cathodic materials that may be used with different anodic materials are NiOOH with Cd, NiOOH with metal hydrides of the $AB_2$ and the $AB_3$ types, NiOOH with Fe and $FES_2$ The binder used in the preferred construction for the cathode layer 21 is a class of high molecular weight binders that exceed 950,000-grams/mole. The preferred polymer used is polyvinylpyrrolidone, K 85-95 or K 120 (higher molecular weight). Other classes of materials that could be used when desired include the following: polyvinyl alcohol, classes of starches and modified starches including rice, potato, corn, and bean varieties; ethyl and hydroxy-ethyl celluloses; methyl celluloses; polyethylene oxides; polyacryamides; as well as mixtures of the above materials. Additional binding may be derived from the use of Teflon solutions or Teflon fibrillated during the blending process.

Next, a double sided dry film adhesive strip 31 such as MACtac's film adhesive #2180, IB 1190 or IB2130 is inserted over the cathode collector and across the cell width and under the anode foil 25. After the anode foil 25 is inserted, another adhesive/caulking layer of film adhesive 31A is applied in the same location except that this one is over the anode as well as over the cathode collector. This sealant material in the cell heat sealing process is thermally activated, thus causing it to flow around and over both collectors thus forming an effective cell seal 13.

For a cell that is about 2"×2", a precut anode strip 25 (1.75"×0.20"×0.004") zinc foil/dry film pressure sensitive adhesive laminate is inserted onto the inside surface of the lower laminate, adjacent to the cathode collector/cathode assembly at gap of about 0.050" from this cathode assembly. Prior to insertion, the 2 mil thick battery grade zinc foil is laminated to a double sided dry film adhesive with a release liner, such as #2180, IB1190 or IB2130 manufactured by Morgan Adhesive Co. of Stow, Ohio, for example. After this lamination is completed on a wide roll of zinc (about 3-12' wide), this laminated structure is slit into narrow rolls with a width of about 0.200" (0.150"-0.300") for a cell that is about 2"×2". Other size cells with other sizes of cathodes may require a different slit width and length for the anode laminate These widths could be as small as about 0.10" to about 1-2" When narrower widths are required then zinc wire could be used for ease of processing. The lengths could vary from a few tenths of inches to many inches. In alternative constructions, the lamination could be done with a printed adhesive on the substrate prior to applying the zinc foil to the substrate.

The paper separator layer 23 with a starch coating is placed over the anode and cathode layers, with the starch coating preferably lying against the anode layer 25. The separator paper may alternatively be placed with the paper side against the anode, where the starch coating would then reside on the opposite side of the paper and not against the anode 25. Alternately the paper separator could be folded so that to allow the starch layer to be against the anode and the plain paper side to be against the cathode.

Alternatively, it has been learned that cell performance can still be satisfactory when the cell does not contain the separator layer but has only the electrolyte. This feature would eliminate the paper insertion station and process, thus reducing cell costs and making the assembly process simpler. Accordingly, a cell embodiment without the separator layer is also provided.

The inner surface of the upper laminate 12 is disposed on top of the lower laminate that contains all of the cell parts (such as by folding the laminate). Prior to applying the upper laminate, the contact holes 17 and 18 are punched out. After its application, these cutouts lie over the negative contact 15 and the positive contact 16 of the cell.

The laminated polymer package comprising the two layers 11 and 12 with the internal structure is heat sealed to form the cell seal 13. The first edge sealed is side C, which is the left hand side of the cell when the cell contacts are on the top and facing the holder as shown in FIG. 2. Next the bottom edge (side B) and top edge (Side A) which runs through the cell collector areas are heat sealed. After those three sides are sealed, an open pouch is formed. The cell electrolyte 26 is now added to the cell, after a few seconds of soak time some of the electrolyte is absorbed by the separator 23 and the cathode 21. The cell seal 13 is now completed by heat sealing the cell right hand edge (Side D).

The measured thickness of the completed printed thin cell using the preferred laminated layers with a thickness of about 3 mils per layer depends on the method of measurement. Using a caliper, which allows the entrapped air to be displaced, the thickness will range from about 15 mils to about 26 mils depending on the cells capacity. At about 6 mAHr, the total cell thickness would be about 0.018", whereas cells with capacities of about 20 mAHr, the thickness would be about 24 mils. If the cell is measured using a digital height gauge and/or a caliper with platens as large as the cell, the cell measured thickness would range from about 0.030" to about 0.50". It has also been found that if a thicker substrate (about 6 mils per layer) as described in this application are used, the amount of entrapped air is minimized, thus the total cell thickness increase is less than the increase in substrate thickness which was by about 6 mils.

Figure 8:
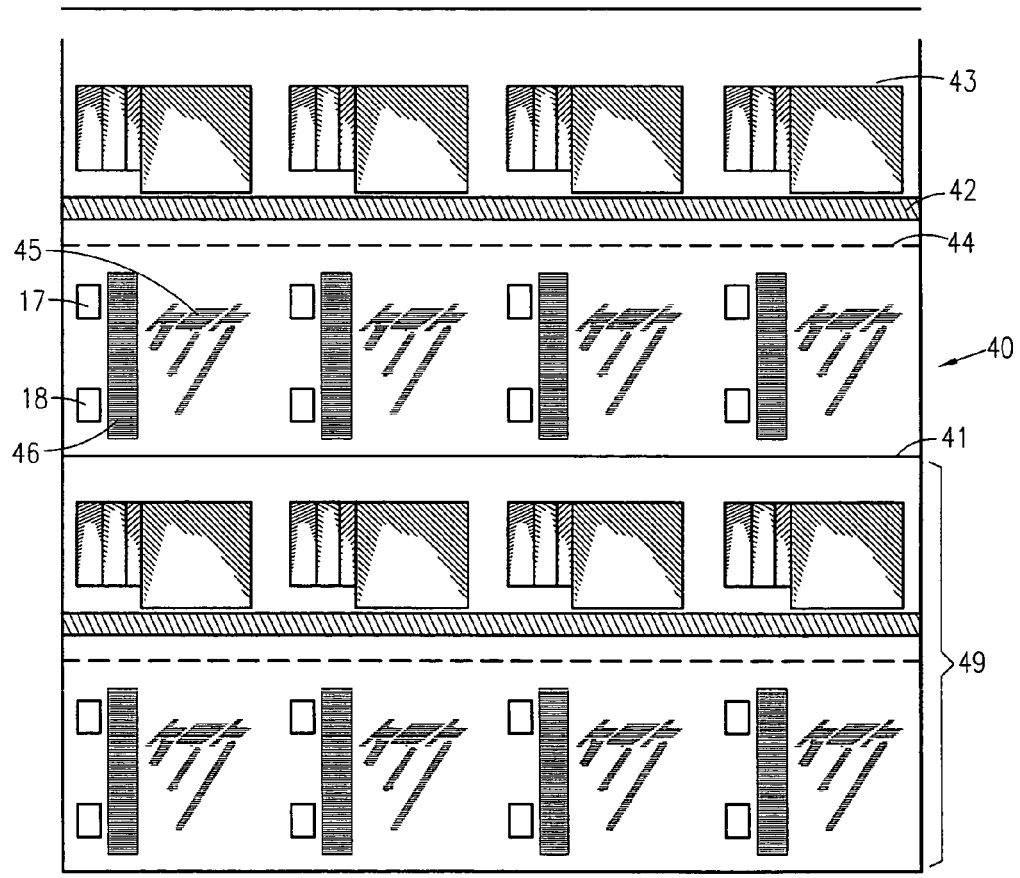
FIG. 8 shows a section of the completed web with high speed format.

To make these thin, printed flexible flat cells at high speeds and at a low cost, the invention provides a format and process for applying the components to the cell package container (laminated film) as well as to process the film with the applied cell components and automatically assemble them into cells. To facilitate this production process, some parts of cell construction described above are modified as shown in FIGS. 6 and 7 and described in the following paragraphs:

In the embodiment of the battery cell 200 of FIGS. 6, 6a, upper laminate layer 211 and lower laminate layer 212 are combined, using a single layer substrate 256, and then after all of the cell components are added to its inner surface, the laminate is folded over its center 244 to form the upper and lower layers 211, 212, respectively. FIG. 8 shows a web format 50 of how the cells may be arranged on a laminate sheet/web. In alternate construction, the upper layer could be inserted or laminated in place instead of the preferred construction of folding the wide substrate sheet/web.

Referring back to the embodiment 200 of FIGS. 6-6a, the zinc foil/adhesive laminate is not added in precut strips as in the original construction described above, but is added as one continuous strip 225 in the machine direction of the press (see also the continuous anode strip 42 shown in FIG. 8). This allows for easy lamination on a high-speed printing press or other types of web processing equipment. This then places zinc foil in both the top and bottom seal areas of the cell. Alternatively and less preferably, the zinc foil/adhesive laminate can be oriented in the transverse direction of the machine, which may provide additional advantages in cell/battery assembly.

In the previous description of the cell construction, double sided dry film adhesive is applied in the top seal area. This was done below the zinc foil/adhesive laminate as well above this laminate. This material is used to seal the cell contacts prior to them extending to the outside of the cell. In the high speed production construction, the dry film adhesive could be replaced by a printable adhesive/caulking type material 231, such as an asphalt solution or a heat sealable adhesive #PM040 made by Acheson Colloids. This material, in addition of being heat sealable, has good adhesion to the substrate, zinc foil, and printed ink cathode collector. In some instances it may be advantageous to use both the dry film adhesive and the printed adhesive together.

Figure 7:
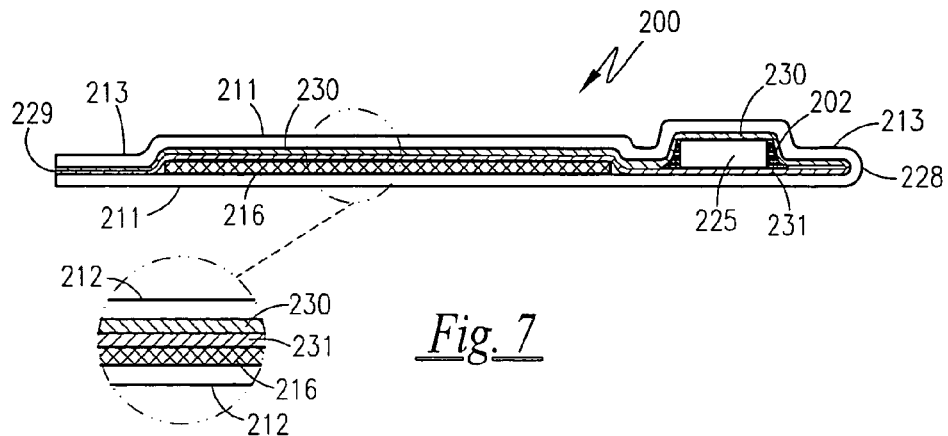
FIG. 7 shows a cross section of the modified cell construction through the contact seal area.

This printed pattern is printed through the contact seal area 231 as well in the bottom seal area 232 for the continuous anode strip. This Adhesive strip 232 could be of various lengths including extension in both directions across the entire bottom or similar in length to top adhesive strip 231. As shown in the FIG. 6-6a, this adhesive/caulking stripe is printed on both halves of the folded web. FIG. 7 shows a cross section of this web through the top seal area in the folded position. FIG. 7 shows the folded edge 228 as well as the open end 229. This construction puts the adhesive/caulking material above the anode strip 230 and below the anode strip 231 which allows it to fill in the anode substrate gap 202.

In the above description of the cell construction, double sided dry film adhesive is applied in the top seal area. This was done below the zinc foil/adhesive laminate 225 as well above this laminate. This material was used to seal the cell contacts prior to them extending to the outside of the cell. In the embodiment of FIGS. 6-6a, the dry film adhesive was replaced by a printable adhesive/caulking type material 231 such as an asphalt solution or a heat sealable adhesive #PM040 made by Acheson Colloids. This printed pattern is printed through the contact seal area 216 as well in the bottom seal area 232 for the continuous anode strip as shown in FIG. 6, 6a. This adhesive/caulking stripe is printed on both halves of the folded web.

FIG. 7 shows a cross section of this web through the contact seal area in the folded position. FIG. 7 shows the folded edge 228 as well as the open end 229. This construction puts the adhesive/caulking material 230 above the anode strip 225 and below 231 the anode strip 225 which allows it to fill in the anode substrate gap 202. In some instances it may be advantageous to use both the dry film adhesive and the printed adhesive together.

It has been further discovered that the above adhesive effectiveness can be increased with a specific geometry. This new geometry as shown in FIG. 6a is referred to herein as a "picture frame design". Although shown as rectangle in FIG. 6a, the exact geometry and width of the "picture frame" will depend on the cell geometry, thus many patterns such as circles, squares, triangles, or combinations thereof, etc., are possible and can be used depending on the application. In the example shown in this application (FIG. 6a) this new pattern 231a and 230a can have at least two advantages over that previously described. These are as follows:

The picture frame is intended to keep all of the active cell materials contained within the frame. In actual practice, the amount of cell leakage has seen a noticeable reduction. It is believed that the heat sealable adhesive is more effective using a sealant/caulking material than the standard amorphous heat sealing layer; and By using the picture frame adhesive pattern, which is located only in the required seal area, the amorphous heat sealing layer which covers the entire substrate could be eliminated. This layer removal would then make the specialized substrate easier to make and less expensive.

In an alternative embodiment, the manufacturing process could be further improved by eliminating the zinc foil/adhesive laminate by instead printing the anode. This could be done in the following manners:

The first method would be to make a conductive zinc ink similar to the present conductive silver, conductive nickel, or carbon inks etc. This ink is then printed in patterns to match the cells cathode. A typical example of this cell construction 600 is shown in FIG. 6b. In this figure all of the part numbers are the same as in FIG. 6, 6a cell construction 200 except for the parts that have been changed.

This embodiment shown in FIG. 6b includes a printed anode 625, which is about 0.20"×about 0.002" thick. The width and thickness of this structure controls the cell capacity, thus the above dimensions are only typical for the size described in this application, and can be varied as needed. The location of the printed adhesive 631a can be printed on top of the anode and not under the anode composite of construction 200.

Referring to FIG. 6c, the first step in using this alternate process of a printed anode would be to print a conductive pattern that is in the same location as the desired anode with the exception that the anode collector 636 is extended through the top seal area 631a, to form negative contact area 616 which is the similar as with the cathode collector 222 when extended through seal area to form positive contact area 216. The preferred material would be the same material as the conductive carbon as used for the cathode collector. By using the same material, an extra printing station would not be required since this material is already being printed for the cathode collector. The major restriction for choosing the anode collector material is its compatibility with the zinc anode, thus the preferred material chosen is carbon.

Other materials that may be used for the anode collector include platinum, titanium or tantalum. The need for the anode collector is that zinc ink is very difficult to make conductive, thus when a substantially non conductive zinc ink is used for the electrochemical anode layer, the anode should have an anode current collector for the same reason that the cathode requires a cathode current collector. To make the anode even more conductive, a highly conductive anode contact 616 is printed on top of the anode collector. This could be an ink comprising silver or another highly conductive material could be used and printed at the same time and at the same station as the cathode contact 216. The use of the printed anode concept could have many advantages when compared the zinc foil/adhesive laminate. These are discussed in the following paragraphs.

The anode application can be done on-line and at the same time the other parts of the cell are printed, thus the off-line operations of zinc foil to adhesive lamination and the slitting of this zinc/adhesive laminate can be eliminated. Also the application (lamination) of the zinc foil/laminate on a special printing press station or in an off line operation is also eliminated. Additionally the anode shape and size can be easily changed by just changing the printing screen or printing plates.

The thickness of the printed material in the seal area, whether it is the collector or the anode, can be made much thinner than when using the zinc/adhesive laminate thus allowing for a better sealing condition that is the same or similar to the cathode collector.

The zinc foil/adhesive laminate is most easily applied in a continuous strip in the machine direction, and its geometry is limited to rectangles and with a width that is limited to the slitting capabilities. Also, because the anode strip is continuous, the laminate must be applied to the entire cell length even in the bottom seal area. This feature causes an increase in laminate usage as well as complicating the bottom seal area in terms of process and effectiveness. The printed anode could be of any geometry and printed easily in the machine direction as well as in the transverse direction.

Internal resistance in the cell can be further reduced by treating the cured/dried current collector, cathode, and/or anode ink deposits with corona or plasma prior to applying any subsequent layer. Reduced internal cell resistance will serve to increase the discharge current rate capability of the cell. This feature is achieved by two aspects of the surface treatments; a) increase surface tension and thereby improve wettability and intimate contact between conductive layers and, b) chemically or physically etch away the resinous (and electrically insulative) surface of the cured/dried conductive ink, thereby exposing more of the conductive particles for electrical connection to the subsequent layer.

Other contributing factors of corona or plasma treatment include removal of organic and inorganic contamination, increased inter-layer bond strength, and removal of residue. In this manner, the cathode layer will have better electrical contact with the current collector layer, the cathode layer and Zinc ink will have better electrical contact to the electrolyte.

A description of the effects of both treatments follow: Corona causes oxygen molecules in the discharge area to divide into their atomic form. These oxygen atoms are then available to bond with the molecules on the surface of the material being treated, thereby changing the surface molecular structure to one that is extremely receptive to inks, coatings, and various adhesives. Most film and sheet materials have a smooth, slippery surface (low surface tension). Corona treatment, in effect, chemically roughens the surface (raising the surface tension), allowing it to grab onto the ink, coating, or adhesive being applied. In reality, the resulting chemical bond that occurs is better than a simple mechanical bond with the surface.

Plasma is the fourth state of matter, created by charging a gas with a large amount of energy. While plasma behaves much like gas, it emits light and contains free ions and electrons. When plasma is projected at high speed towards an object, its surface reacts with the plasma.

Plasma treating is blasting the surface of an object on the microscopic level, using highly energized molecules and ions. Moreover, when using air as a plasma source, the oxygen reacts with contaminants such as carbohydrates on the surface of the object; it breaks up the chains and helps blast them away. On organic surfaces, polar groups and active radicals can be created, that help multiply surface adhesion. A useful side effect is that of neutralization and de-dusting of a treated surface.

Manufacturing Method

Figure 9:
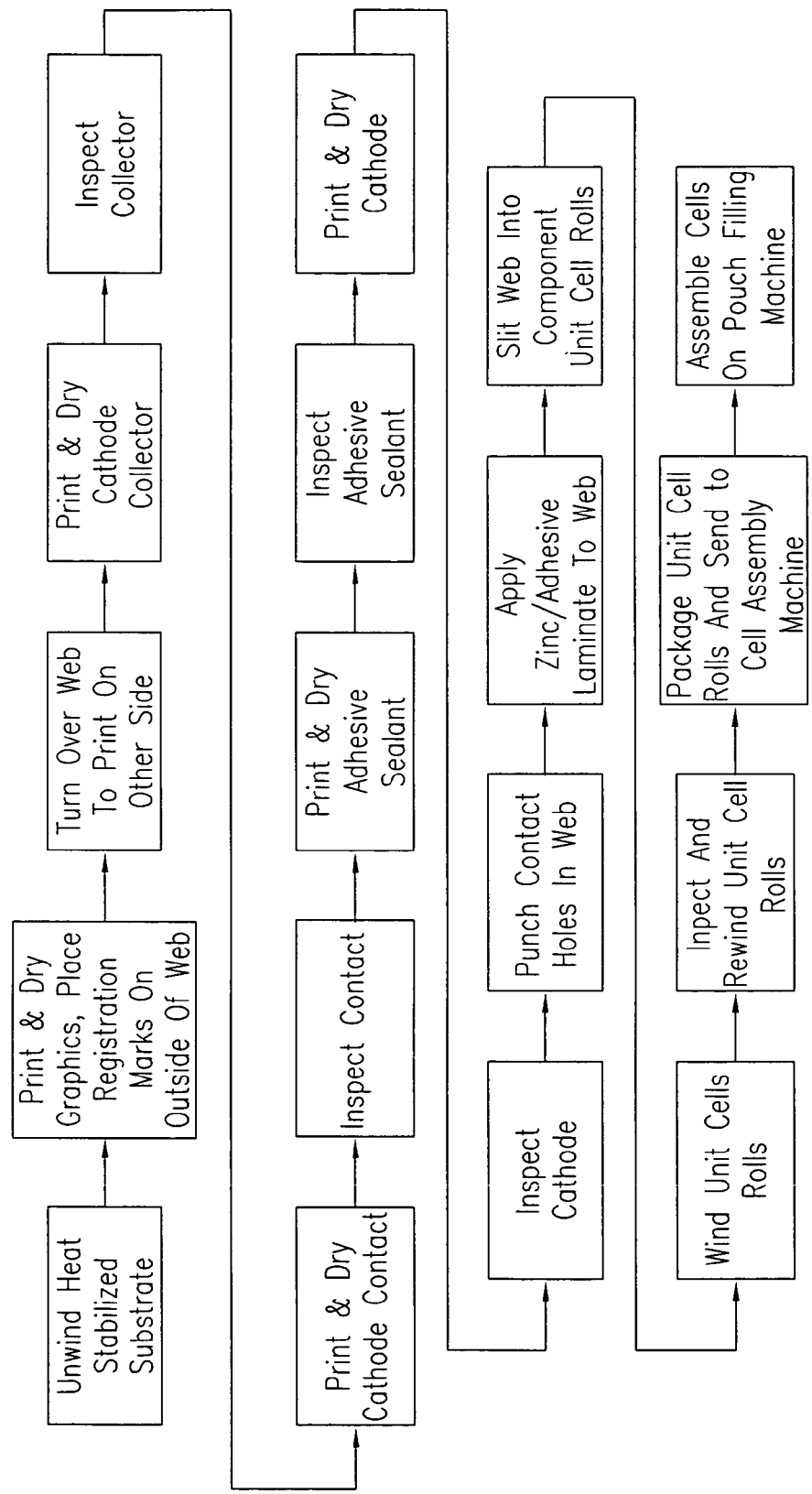
FIG. 9 shows a flow chart for a preferred high speed production process.

The high-speed high volume production process preferably uses web format 40, as shown in FIG. 8, and is processed as per the flow diagram of FIG. 9.

The web format 50 for a nominal 1 sq. inch cathode with its edges already trimmed to size is shown for two wide is about 8.00". The web could be easily modified to print any cell size and or geometry. In high speed/high volume production, the web format would contain at least four cells wide or about a total web width of about 18" prior to trimming to final size of 16.0".

The multiple rows of cells would be slit at slit line 41. This 4" wide roll contains all of the cell components that are required for the cell assembly machine, which is chosen to be a horizontal pouch filler. This completed web 50 includes the zinc/adhesive laminate 42, which is spaced at about 0.050" away from the cathode/cathode collector assembly 43.

On the other side of the fold line 44 the cell graphics 45 can be printed on the opposite side of the web using conventional graphic ink of any desired color combination. Part of the graphics 45 can also note the contact polarity shown in the box 46. Although not shown in the figure, the graphics layer could also include a code date on any part of the cell case, if desired.

Also on that part of the web are the negative contact cutout 17 as well as the positive contact cutout 18. When this part of the web is folded on the fold line 44, such as in the pouch filler cell assembly line, these cutouts will allow for external electrical contact to the cell anode and cathode.

Figure 10:
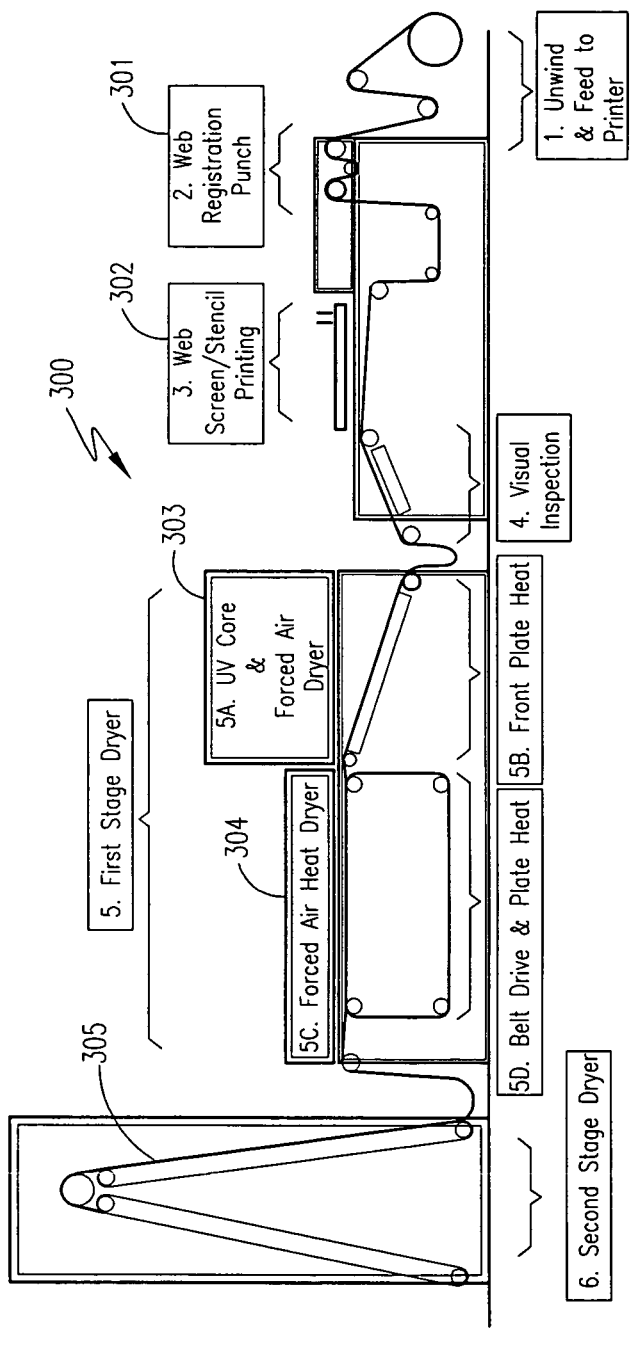
FIG. 10 is schematic drawing of a single print station for one embodiment.

The web can be processed on a multiple station continuous web based printing press. This could be done with a single pass on an eleven station printing press or multiple passes on a press with less stations which could have flat bed screen printing stations 300 such as manufactured by Klemm, as shown in FIG. 10. The press also could be a continuous web press including printing and mechanical operations with various types of printing methods such as the ones manufactured by MarkAndy. These printing stations could include rotary screen, flexographic and even gravure.

The first Klemm station of FIG. 10 is comprised of a web registration mechanism such as hole punching station 301 or other methods for web registration. (Only the first station typically needs to have this registration mechanism as the other stations use this method for controlling the web edge.).

Next is the printing station 302, which could use screens and/or stencils, for example. The choice would be based on the material to be printed, the print pattern, as well as the required print thickness.

After the ink is laid down, it should be dried and/or cured. This could be done by means of UV lights 303 and/or forced air drier 304. If more drying time is required, then a tower type drier 305 could also be used.

Figure 11:
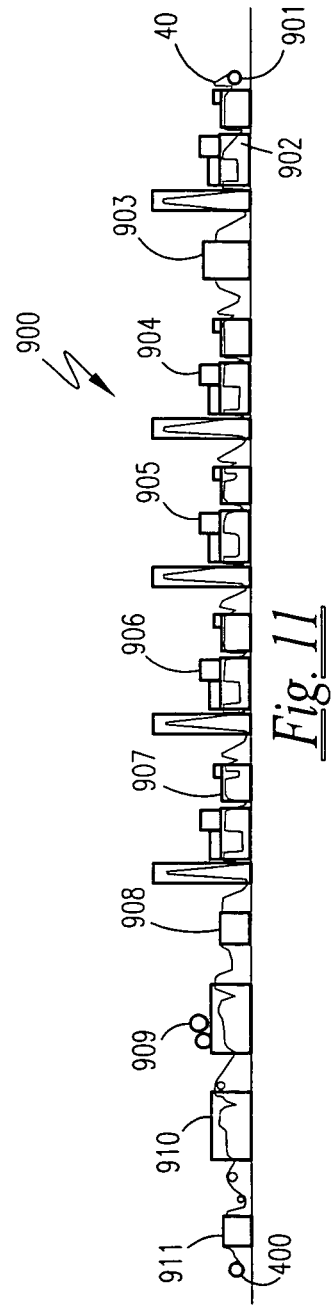
FIG. 11 is schematic drawing of a continuous printing press and auxiliary equipment for one method of manufacturing the flat cell.

The entire manufacturing process uses print stations as well as other type stations, as shown in FIG. 11. This manufacturing process machine 900 includes an unwind station 901 for the web 40, the first print station 902, which also includes a web registration method, prints the graphics on the top side of the web 40, which is the cell outside 211, then a web turnover station 903 turns over the web to allow printing of the webs bottom surface (212 of FIG. 6) which is the bottom side of the web 40.

The web 50 is then processed through a collector printing station 904, a cathode contact print station 905, a adhesive/caulking print station 906, and a cathode print station 907. Depending on the press design, ink to be printed and the required print thickness, the method of printing for the various stations could be rotary screen, flexography, gravure, stencil, etc. After all of the printing operations are completed, the web 50 is then processed in the next station 908. This station punches the contact holes 217 (negative contact) and 218 (positive contact) in the web 40. The web then moves to the anode application station 909.

Figure 12:
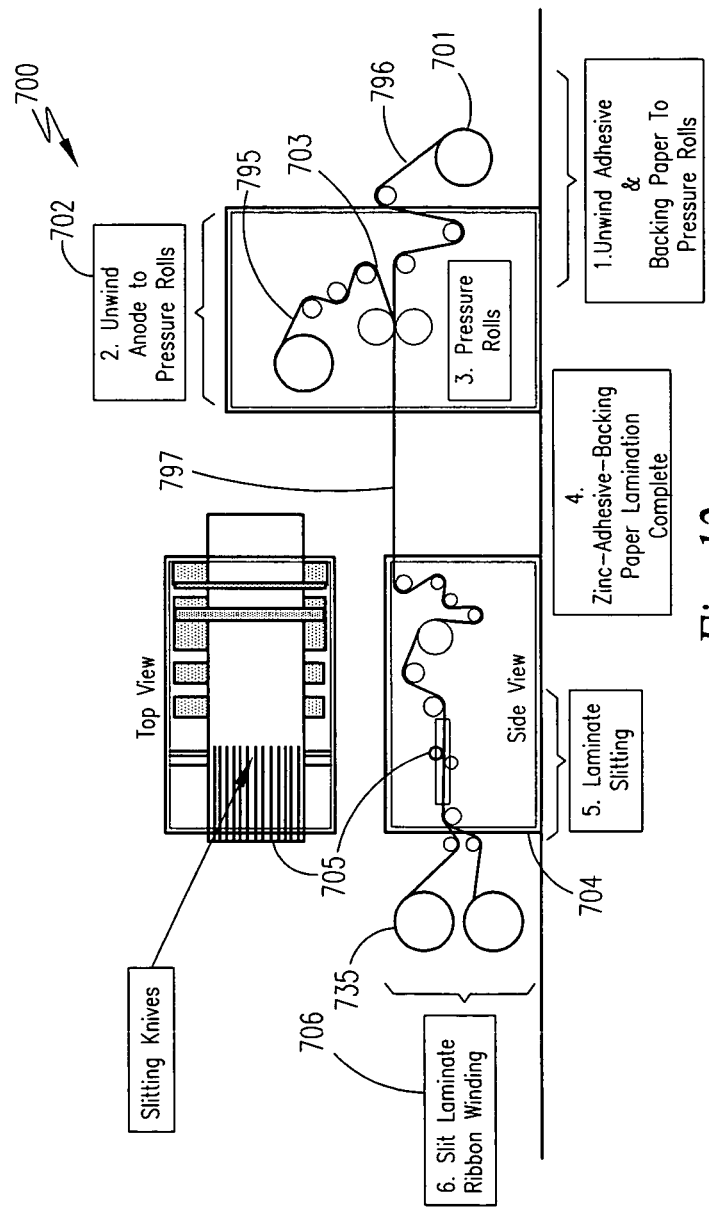
FIG. 12 is a schematic drawing of a zinc/adhesive (anode) lamination station.

Prior to the application of the anode 25 to the web 40, the zinc/adhesive laminate 225 is made on auxiliary equipment such as shown in FIG. 12. This laminating machine 700 is comprised of an Adhesive/liner unwind station 701, zinc foil unwind station 702, and a set of pressure rolls 703. In this station, the zinc foil 795 is "married" to the adhesive film/liner 796 due to the force created to the two films as they pass through the pressure rolls 703.

After the zinc foil/adhesive laminate 797 is formed, it is fed into a slitting station 704 that contains a set of slitting knives 705 (the number of knives depends on the web width as well as the required slit width). This laminate 797 is slit into individual rolls 735 at a rewind station 706 to form the anode laminate 725.

Figure 13:
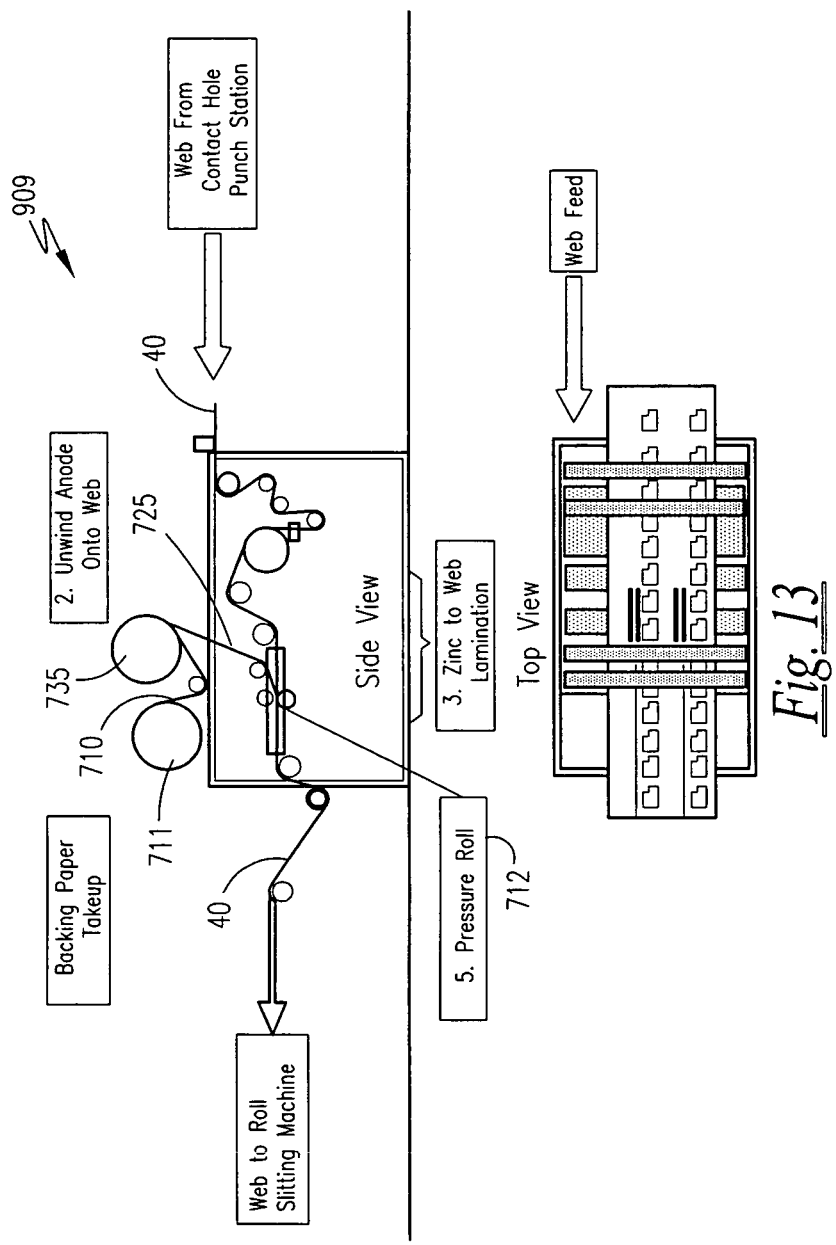
FIG. 13 is another schematic drawing of the zinc/adhesive (anode) application station.

This individual roll of anode laminate 735 is then placed in the anode application station 909 of the multi-station manufacturing machine 900 shown in FIGS. 11 and 13. The anode laminate roll 735 is unwound, the adhesive laminate release liner 710 is wound on a roll 711 prior to its disposal, and the anode laminate 725 applied in a continuous strip adjacent to the cathode collector assembly 43 on web 50 at a nominal spacing of about 0.050" and an acceptable range of about 0.010"-0.20".

The pressure rolls 712 apply the required force to this operation to ensure good bonding to the anode laminate 725 to the web 40. The processing of web 50 is completed when the rows of cells 49 are slit on lines 41 in station 910. The individual rows of cells 49 of web 50 are then wound on individual cores in station 911 as shown in FIG. 11. The unit rows of cells 49 are then rewound and inspected to determine the quality of the processed materials. This operation allows defective materials to be marked and/or removed from the row prior to processing on the cell assembly machine to form web roll 400.

The cell material is then provided in web roll 400 to the pouch assembly machine in single unit wide with a length of several thousand units. The web as shown in FIGS. 6, 6a, 6b, 6c, and 8 contains the lower substrate 212, printed collector 222, printed collector contact 216, printed cathode 221, printed seal adhesive 231 and 230, and zinc foil/adhesive laminate 225 on the one side that will become the internal side of the battery once the web 400 is folded to form the upper laminate 211 and lower laminate 212. On the other side of the web, contact cutouts 217 and 218 are present. Graphics may or may not be used on this side of the web 40 which is the outside of the final unit.

Figure 14:
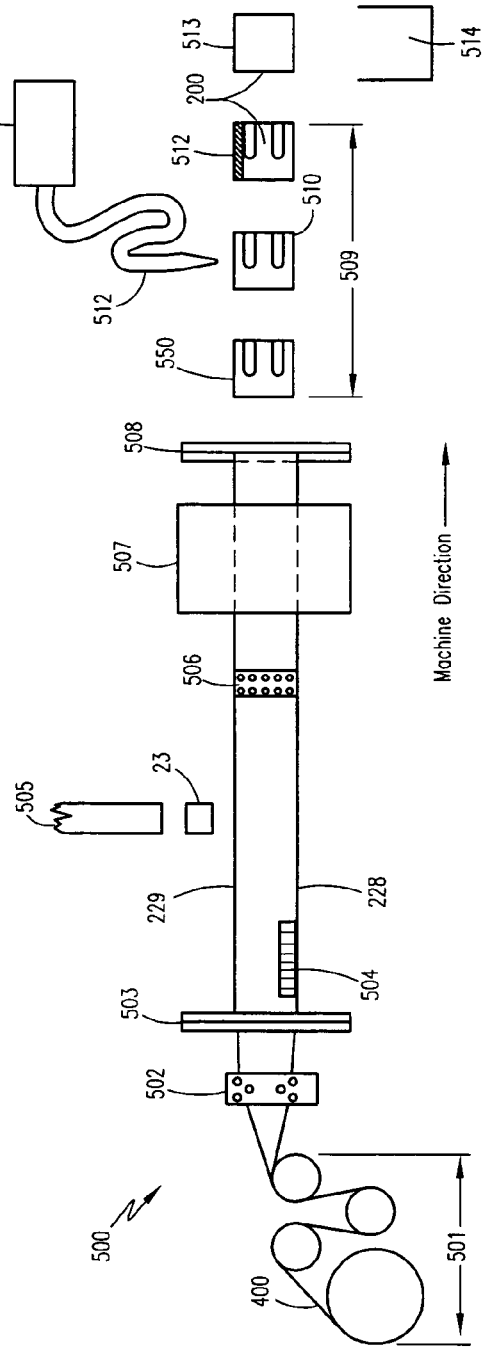
FIG. 14 is schematic drawing of a modified horizontal pouch filling machine.

The web 400 is then placed in the unwind station 501 of a horizontal pouch filling machine 500 shown in FIG. 14. Pouch filling machines are made by several domestic companies including Bartelt of Florida and HMC Products of Rockford, Ill.

The web is unwound in the first Station 501 then folded in the middle (centerline of web 44) to provide even edges for sealing and proper location of the contact cutouts for connections to the battery by external connections. Folding begins to take place through a collar-guide fixture (Station 502) that aligns the two top edges or the former outside web edges to match for alignment, joining, and sealing. Folding and alignment is also provided by two (2) vertical bars (Station 503) that push the two (2) sides of the web together until they are heat sealed together in station 504.

The forming collar-guide 502 is a new innovation used on a horizontal Pouch Filling Machine. Conventionally, the folding operation is done with a plough. With the plough the inside layer of the web passes over the outside of the plough.

In typical filler pouch operations, where pouches are filled with various materials such as food products, the inside layer of the pouch is a smooth surface thus the abrasion between the plough and the web is not a problem. In the case of the unit cell according to the invention, the inside layer of the web 400 has printed patterns. It was discovered by the inventors that these printed patterns were abraded as they passed over the plough. To eliminate this detrimental condition, web forming was done with collar-guide 502, thus the abrasion of the web 400 and the forming tool was on the outside layer, thus the inside printed layers were not abraded.

Heat sealing (Station 504) at or near the folded edge 228 which is designated as cell side C in the orientation of the final cell or the bottom of the folded web 400 will prevent unfolding thus securing the fold in the proper location. Proper location of the two (2) top edges 229 is even with one another.

Next, the separator 23 is inserted between the open sides of the web in Station 505. The paper separator is pre-slit to the proper width and placed on a reel. Then just prior to insertion its length is cut to the proper size. Note that if the cell being manufactured is not using the separator layer, this step can be skipped.

Next, the vertical heat sealing is done in station 506 to both the leading and lagging seals of two (2) adjacent units in one heat seal operation. This allows for the cell to be cut in station 508 near the center of this double wide seal that provides the leading and lagging seal of two adjacent units. These cell seal sides are designated as sides A & B.

The draw rolls (Station 507) pulls the web from the unwind station to the knife station 508. This station cuts the leading cell pouch 550 from the web 400 which is then picked up by the next pouch clip of station 509. There are twenty-four cell clips (not shown) which are attached to a continuous chain of Station 509. This chain/clip assembly of station 509 moves the pouch through the remaining stations of the pouch filler.

Station 510 has three major components. These are an accurate pump 511, such as manufactured by Hibar of Canada, a nozzle with or without mechanical movement 512 such as manufactured by HMC Products of Illinois, and a pouch vacuum opening and closing mechanism (not shown). This combination permits for insertion of the nozzle in an opened pouch which results in a precise amount electrolyte 26 to be dispensed into an opened cell pouch 550.

In order to facilitate sanitary dispensing of the electrolyte solution in this production process, polymeric thickeners can be added to the electrolyte solution. The preferred material is carboxymethylcellulose in the amount of about 0.6% with a range of about 0.01%-1.2% of the total electrolyte by weight. Alternate classes of thickeners may also be used. These may be from the same class of materials as the cathode binders. Other less preferable classes of materials include the following: polyvinyl alcohol, classes of starches and modified starches including rice, potato, corn, and bean varieties; ethyl and hydroxyl-ethyl celluloses; methyl celluloses; polyethylene oxides; polyacryamides; as well as mixtures of the above materials.

The use of these electrolyte thickeners minimizes or eliminates contamination to the cell outside package. It also minimizes and/or eliminates contamination of the seal area prior to sealing. This in combination with the high viscosity electrolyte minimizes and/or eliminates cell leakage for the life of the cell. Due to this performance advantage, the use of this thickened electrolyte is also preferred when the cells are made in low volume made cells such as by hand or with simple slow speed equipment.

After dispensing, the sides are allowed to close in such a manner that the trapped air is bled out of the pouch prior to making the final heat seal (cell top—side D) in station 512.

The pouch (cell 200) is then heat sealed on all four sides and it contains all necessary components and materials. Before the completed cell 200 is removed from the clip, each cell could be code dated by means of stamping, ink jet printing, or other suitable means. Also prior to its removal, each cell could be voltage checked.

The completed cell including code dating and electrically checked are removed in station 513 and dropped into a container 514 for transport for later operations. This container contains only the good cells based on the electrical tests and/or the defective cells are marked and included in the same container.

The removal of the good cells can be accomplished using a number of alternative operations, including vacuum arm removal and placing in position on its application, placing in shipping container, placing on a roll of PSA adhesive to form a roll of "cell labels", etc.

Furthermore, as discussed above, internal resistance in the cell can be further reduced by treating, at some appropriate point during the manufacturing process (such as during the printing operations, by adding an additional station), the cured/dried current collector, cathode, and/or anode ink deposits with corona or plasma prior to applying any subsequent layer.

Multi-Cell Batteries

Some applications may require 3 volts and/or higher current capabilities for proper operation, thus battery packs with series and/or parallel connections are desired to meet these higher voltage and current requirements. These battery packs could be made in many different constructions, some of which are described below.

FIGS. 15-20 describes some of these constructions. FIG. 15 and FIG. 16 shows three different battery constructions by using unit cells 10 connected in series. The batteries shown in FIG. 15 include 3 volt 300, 6 volt 600 and 9 volt 900 batteries without a top label. In FIG. 16, the similar batteries with unit cells 10L are shown and include 3 volt 30L, 6 volt 60L and 9 volt 90L are shown with a top label, thus only the negative contact 115 and positive contact 117 is exposed.

Although these batteries have different voltages, they use the similar basic construction for the individual cells as described above. There are several basic constructions that could be used for a 3 volt battery 30 or 350.

Figure 17:
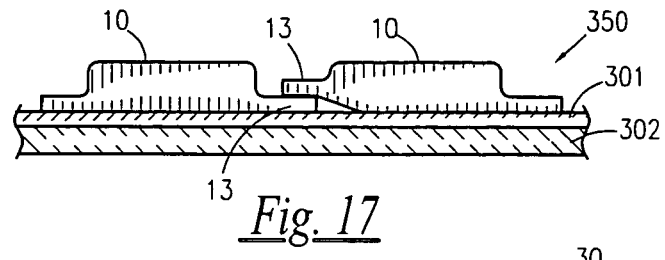
FIG. 17 shows a battery label construction using unit cells.

FIG. 17 shows a section view of battery 350 that uses a double sided film adhesive 301 with a release liner 302 that will form a battery label 350. Two unit cells 10 are placed on the adhesive. To minimize the area these cells consume, the inside heat seal areas 13 can be made overlapping. If the area is not critical, these unit cells then could be placed edge to edge.

As shown in FIG. 16, the two unit cells can be connected in series by means of a metallic foil 304 that is fastened to each by means of a conductive adhesive at points 305 and 306. This adhesive could be Acheson Colloids silver filled epoxy #5810 or Emerson and Cuming's snap cure conductive adhesive #12873-32, for example. A drop of conductive adhesive 305 is placed on the unit cells at negative contact 15 (right hand cell) as well a drop 306 as on positive contact 16 (Left hand side cell). After these are placed, a metal foil strip 304 such as zinc is placed on top, and then the conductive adhesive is cured. When the adhesive is cured, a battery label is completed and can be used by removing the release liner and mount the battery on the application.

Figure 18:
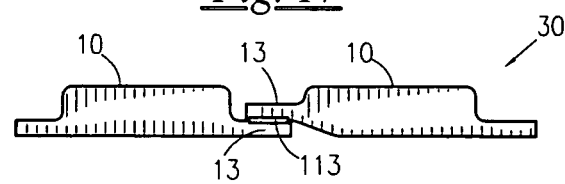
FIG. 18 shows a thin battery construction made with unit cells but without a supporting substrate.

A second construction is also proposed, with a cross section drawing of such a construction shown in FIG. 18. In this construction, the unit cells 10 are attached to each other by overlapping the inside seal areas 13. After being overlapped, the seal area could be heat sealed together or fastened by a pressure sensitive adhesive 113, thus completing the 3 volt battery 30 assembly, except for the electrical connections. The electrical connections are then made as described in the prior construction.

Figure 19:
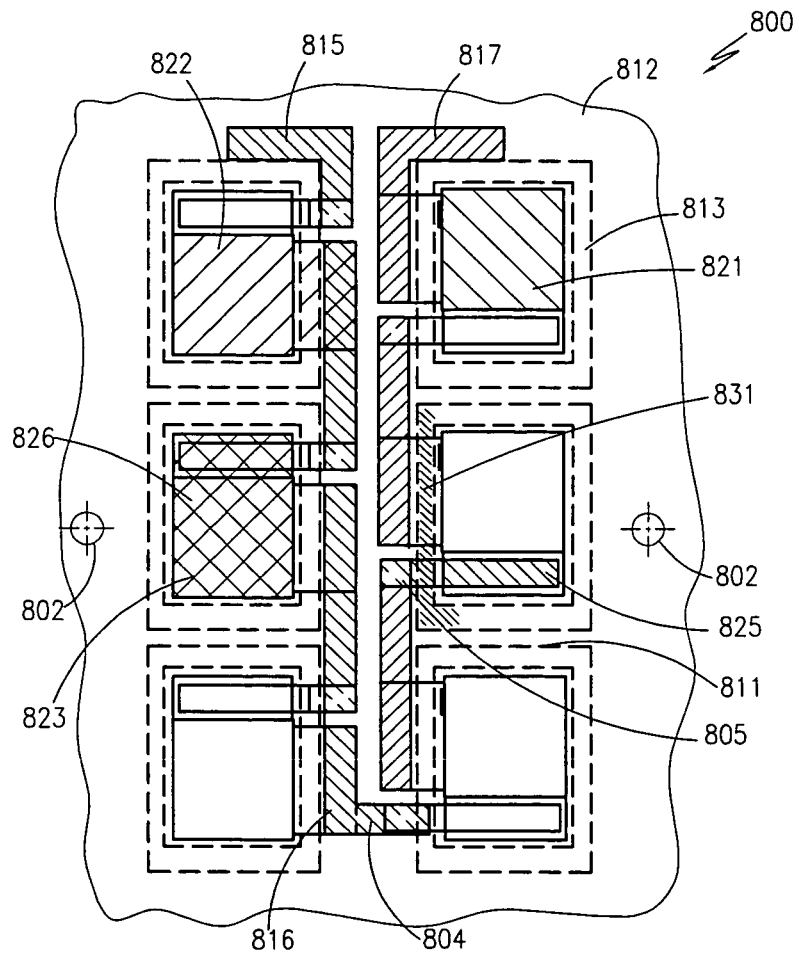
FIG. 19 shows a printed battery construction.

Battery constructions could also be made by printing the unit cells together, as shown in FIG. 19. This figure shows a printed 9 volt battery 800 which is printed on the lower laminate 812. In an effort to make reading and understanding this drawing easier, the individual cell/battery parts are shown cross hatched where identified by a number.

As in the printing of a unit cell described earlier, the first layer to be printed is the carbon cathode collector 822 and since a 9 volt battery is being made there will be six unit cells in the group that are electrically connected in the printing operations, thus there will be six cathode collectors 822 and six cathodes 821 etc. for each battery.

The next printed layer is the silver or other highly conductive material cathode contact 816. At the same time that the silver contact is being printed, the cell connectors 804 that connect the cell negative to the adjacent cells positive are also printed in five different locations.

The final items printed at the same time with the same ink are the battery contacts. These are the battery negative contact 815 and the battery positive contact 817. As in the unit cell sealing step, the anode and cathode collector in the seal areas can use an adhesive/caulking 831 that is heat activated while the seal is being made is printed on each of the six unit cells. A drop of conductive adhesive 805 is applied on top of the previously printed battery connector 804, which will be directly below the precut anode strips 825. These strips, which have been previously described, are the zinc/adhesive laminate which are applied to each cell using the same or similar techniques explained above for the unit cell construction, and on top of conductive adhesive 805. In this battery application the dry film PSA is not applied or it is removed in the area where the conductive adhesive is applied. This adhesive could be Acheson's 5810 silver conductive epoxy or Emerson and Cummings snap cure silver conductive adhesive, for example.

Figure 20:
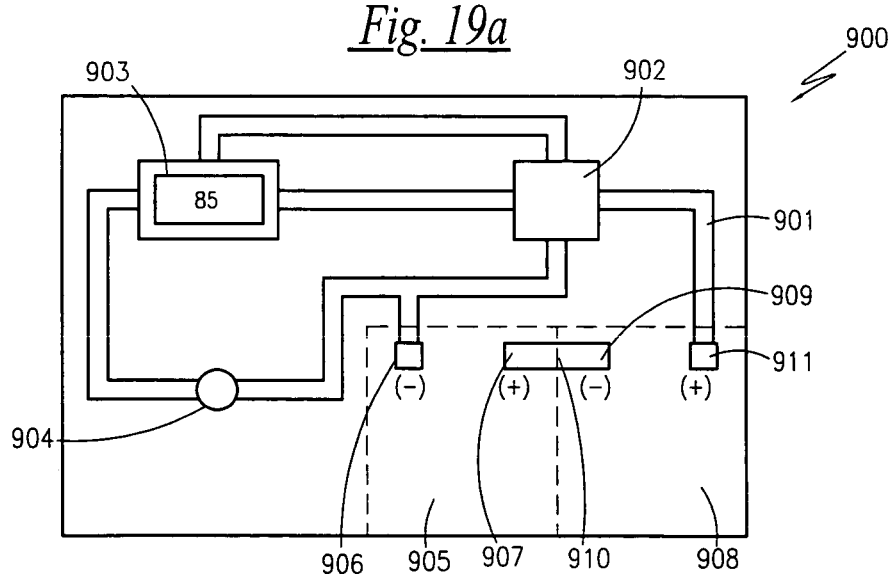
FIG. 20 shows an electronic application integrated with battery contacts for a three-volt battery with the use of unit cells.

A further construction according to the invention is to integrate the cell/battery construction into the application device itself. This could be done as shown in FIG. 20, showing a thermal sensor device 900 comprising the circuit 901 including battery contacts 906, 910, and 911, thermal sensor 902, and digital display 903 that continuously displays the temperature, flashing LED light 904 which is activated when the temperature is out of the specified range.

Finally are the contacts for the two unit cells to form the required 3 volt battery which define the locations of the 1.5 volt unit cells. Unit cell #1 905 has a negative contact 906 and positive contact 907, unit cell 908 has a negative contact 909 and positive contact 911. A jumper bar 910 which is part of the printed circuit connects to the unit cell 905 positive contact 907 to the negative contact 909 of unit cell 908, thus forming a series connection and a 3.0 volt battery between unit cells 905 and 908. The unit cells could be connected to circuit 901 by mechanical means such as pressure clamps, clips or any other means to hold the unit cells contacts to the circuit. Also, the contacts could be fastened by solder, conductive adhesives etc. with or without through hole technology.

The printing of the anode and/or anode/anode collector will allow for the direct connection of unit cells into battery packs directly on the printing press, and without the use of conductive adhesives and/or solders etc. The printing of the cell/battery construction and connections is detailed later in this description.

Figure 19A:
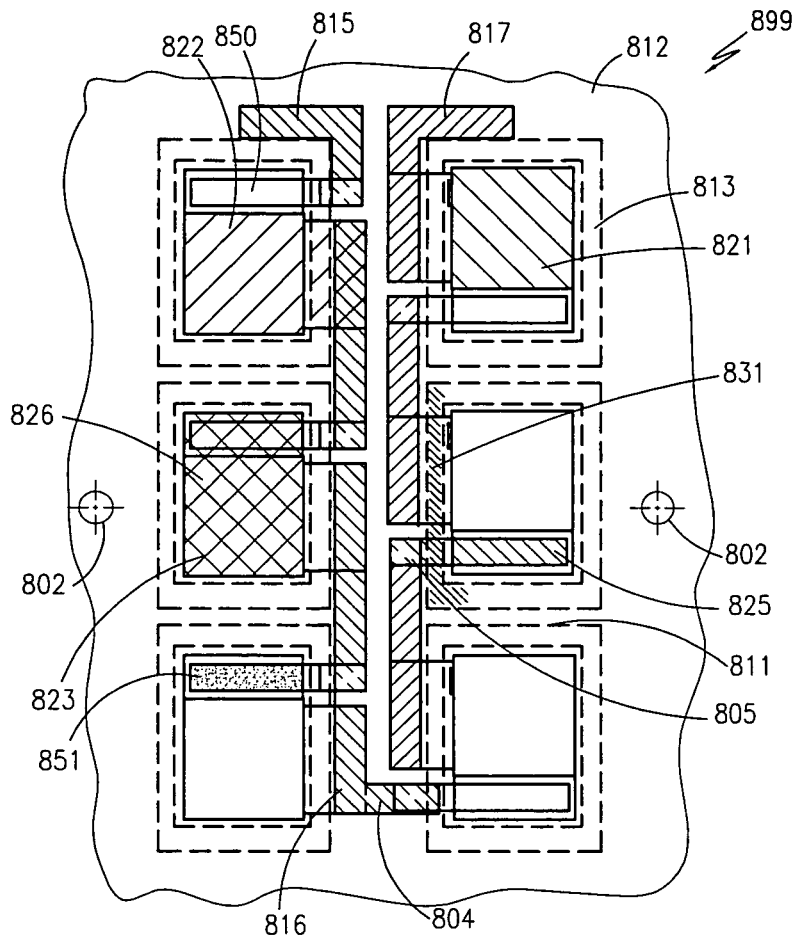
FIG. 19a shows a further preferred printed battery construction.

The changes to the general construction are listed below and shown in battery 899 as shown in FIG. 19A, where six carbon cathode collectors 822 are printed and six anode collectors 850 are also printed. On top of the anode collector, the zinc anode 851 is printed within the cell active area as shown by the patterned area.

Because the anode collector can be printed, the need for the conductive adhesive 805 as described in battery 800 construction of FIG. 19 (see below) is not required because the printed silver contacts will make an excellent connection to all of the printed contacts and connectors and thus good electrical contact.

The electronic application or similar device might also be manufactured using the technology of printed anode batteries described above. In this process, the printed battery (or a cell if the application requires 1.5 volts) is made as described in the above paragraphs. This process is then expanded to include the required operations to make the device on the same substrate using similar or additional method steps.

Thin printed flexible cells/batteries can have many potential applications. These include the following general categories as examples:
1) Advertising and promotion
2) Toys, novelties, books, greeting cards, and games
3) Inventory tracking and control such as (smart RFID tags)
4) Security tags
5) Condition indicators such as temperature, humidity, etc.
6) Iontophoretic applications for pharmaceuticals and/or cosmetics
7) Healthcare products such as smart diapers, incontinence products, etc.

The invention has been described hereinabove using specific examples and embodiments; however, it will be understood by those skilled in the art that various alternatives may be used and equivalents may be substituted for elements and/or steps described herein, without deviating from the scope of the invention. Modifications may be necessary to adapt the invention to a particular situation or to particular needs without departing from the scope of the invention. It is intended that the invention not be limited to the particular implementations and embodiments described herein, but that the claims be given their broadest interpretation to cover all embodiments, literal or equivalent, disclosed or not, covered thereby.

What is claimed is:

1. A battery including an electrochemical cell, said electrochemical cell comprising:
    a substrate having an inner surface;
    a first electrochemical layer covering some portion of said inner surface;
    a second electrochemical layer covering another portion of said inner surface and adjacent to said first electrochemical layer;
    an electrolyte layer substantially covering and in electrical contact with both said first electrochemical layer and said second electrochemical layer; and
    a covering layer covering said electrolyte layer and bound to said substrate to form a pouch for sealing said electrolyte layer in an interior of said cell, and
    wherein said covering layer comprises a plurality of laminated layers that includes an oxide coated moisture barrier layer having a moisture vapor transmission rate that permits moisture vapor to escape through said plurality of laminated layers of the covering layer to an external environment, and does not include a metal foil layer.

2. The battery of claim 1, further comprising a plurality of said electrochemical cells electrically connected together all sharing said substrate in common.

3. The battery of claim 1, wherein said plurality of laminated layers includes a structural layer comprising said oxide coated moisture barrier layer and/or a heat sealing layer.

4. The battery of claim 1, wherein said plurality of laminated layers include:
    an inner layer including a polymer film and/or a heat sealing coating;
    said oxide coated moisture barrier layer;
    a first adhesive layer for connecting said inner layer to said oxide coated moisture barrier layer;
    an outer structural layer including an orientated polyester; and
    a second adhesive layer for connecting said oxide coated moisture barrier layer to said outer structural layer.

5. The battery of claim 1, wherein said first electrochemical layer is comprised of a cured and/or dried ink.

6. The battery of claim 5, wherein said ink includes one or more of manganese dioxide, carbon, NiOOH, silver oxides $Ag_2O$ and/or AgO, HgO, oxygen $O_2$ in the form of an air cell, and Vanadium oxide $VO_2$.

7. The battery of claim 5, wherein said second electrochemical layer is comprised of a strip of material laminated to said substrate.

8. The battery of claim 7, wherein said strip of material includes zinc.

9. The battery of claim 5, wherein said second electrochemical layer is comprised of a cured and/or dried ink.

10. The battery of claim 9, wherein said ink includes one or more of zinc, nickel, cadmium, metal hydrides of the $AB_2$ and the $AB_3$ types, iron, and $FeS_2$.

11. The battery of claim 5, further comprising a first collector layer between said first electrochemical layer and said substrate, said first collector layer having a higher conductivity than said first electrochemical layer and said substrate.

12. The battery of claim 11, wherein said first collector layer is comprised of a cured and/or dried conductive ink.

13. The battery of claim 12, further comprising a second collector layer between said second electrochemical layer and said substrate, said second collector layer having a higher conductivity than said second electrochemical layer and said substrate.

14. The battery of claim 13, wherein said second collector layer is comprised of a cured and/or dried conductive ink.

15. The battery of claim 1, further comprising a first collector layer between said first electrochemical layer and said substrate, said first collector layer having a higher conductivity than said first electrochemical layer and said substrate.

16. The battery of claim 15, wherein said first collector layer is comprised of a cured and/or dried conductive ink.

17. The battery of claim 16, further comprising a second collector layer between said second electrochemical layer and said substrate, said second collector layer having a higher conductivity than said second electrochemical layer and said substrate.

18. The battery of claim 1, wherein said battery includes series and/or parallel connections for connecting to an electronic application circuit thereby allowing the use of unit cells.

19. The battery of claim 1, wherein said electrolyte layer includes an absorbent separator layer soaked in electrolyte.

20. The battery of claim 19, wherein said electrolyte includes one or more of: zinc chloride, ammonium chloride, zinc acetate, zinc bromide, zinc Iodide, zinc tartrate, zinc per-chlorate, potassium hydroxide, and sodium hydroxide.

21. The battery of claim 19, wherein said electrolyte includes a polymeric thickener and/or gel having one or more of: carboxymethylcellulose; polyvinyl alcohol; a starch and/or modified starch; ethyl and/or hydroxyl-ethyl cellulose; methyl cellulose; polyethylene oxide; and polyacryamide.

22. The battery of claim 1, wherein one or both of said first electrochemical layer and said second electrochemical layer have been modified via treatment with corona and/or plasma.

23. The battery of claim 1, wherein:
the substrate includes a multi-layer laminate having:
an outer surface, and
the inner surface, wherein
said substrate forms a fold over itself, such that said inner surface forms a first inner side and a second inner side on opposite sides of an interior of said cell, and said outer surface defines a first outer side and a second outer side on opposite sides of the exterior of said battery cell;
the cell further comprising a collector layer, including a first cured and/or dried conductive ink, at least partially covering said first inner side;
wherein the first electrochemical layer includes a second cured and/or dried ink, at least partially covering said collector layer;
wherein the second electrochemical layer is disposed on one of said first inner side and said second inner side, wherein, if said second electrochemical layer is on said first inner side, said second electrochemical layer is adjacent to said first electrochemical layer;
wherein the electrolyte layer is disposed between said first inner side and said second inner side; and
the cell further comprising a connecting layer for connecting a portion of an outer perimeter of said first inner side to a portion of an outer perimeter of said second inner side to bind said first inner side to said second inner side for holding said substrate in the folded position, thereby forming said pouch for containing said electrolyte in the interior of said cell.

24. The battery of claim 1, wherein said first electrochemical layer includes an ink having a polymer binder of a class of high molecular weight that exceeds 950,000-grams/mole.

25. The battery of claim 1, wherein said first electrochemical layer includes an ink having a polymer binder including one or more of polyvinylpyrrolidone, polyvinyl alcohol, a starch, a modified starch, ethyl cellulose, hydroxy-ethyl cellulose; methyl cellulose, polyethylene oxide, polyacryamide, and Teflon.

26. The battery of claim 1, wherein said first electrochemical layer includes an ink containing manganese dioxide (MnO2), carbon, and a polymer binder.

27. The battery of claim 26, wherein said polymer binder contains hydroxy-ethyl cellulose.

28. The battery of claim 5, wherein said ink of said first electrochemical layer includes a polymer binder of a class of high molecular weight that exceeds 950,000-grams/mole.

29. The battery of claim 5, wherein said ink contains manganese dioxide (MnO2), carbon, and a polymer binder.

30. The battery of claim 29, wherein said polymer binder contains hydroxy-ethyl cellulose.

31. The battery of claim 5, wherein said ink of said first electrochemical layer includes a polymer binder including one or more of polyvinylpyrrolidone, polyvinyl alcohol, a starch, a modified starch, ethyl cellulose, hydroxy-ethyl cellulose; methyl cellulose, polyethylene oxide, polyacryamide, and Teflon.

32. The battery of claim 9, wherein said ink of said first electrochemical layer includes a polymer binder of a class of high molecular weight that exceeds 950,000-grams/mole.

33. The battery of claim 9, wherein said ink contains manganese dioxide (MnO2), carbon, and a polymer binder.

34. The battery of claim 33, wherein said polymer binder contains hydroxy-ethyl cellulose.

35. The battery of claim 9, wherein said ink of said first electrochemical layer includes a polymer binder including one or more of polyvinylpyrrolidone, polyvinyl alcohol, a starch, a modified starch, ethyl cellulose, hydroxy-ethyl cellulose; methyl cellulose, polyethylene oxide, polyacryamide, and Teflon.

36. The battery of claim 23, wherein said ink of said first electrochemical layer includes a polymer binder of a class of high molecular weight that exceeds 950,000-grams/mole.

37. The battery of claim 23, wherein said ink contains manganese dioxide (MnO2), carbon, and a polymer binder.

38. The battery of claim 37, wherein said polymer binder contains hydroxy-ethyl cellulose.

39. The battery of claim 23, wherein said ink of said first electrochemical layer includes a polymer binder including one or more of polyvinylpyrrolidone, polyvinyl alcohol, a starch, a modified starch, ethyl cellulose, hydroxy-ethyl cellulose; methyl cellulose, polyethylene oxide, polyacryamide, and Teflon.

40. The battery of claim 1, wherein:
the substrate includes a multi-layer laminate having the inner surface, wherein said substrate forms a fold over itself, such that said inner surface forms a first inner side and a second inner side on opposite sides of the interior of said cell;
the first electrochemical layer is on at least one of said first inner side and said second inner side, including a cured or dried ink having manganese dioxide (MnO2), carbon, and a polymer binder containing hydroxy-ethyl cellulose; and
the second electrochemical layer is on the same inner side as said first electrochemical layer.

41. The battery of claim 1, wherein:
the substrate includes a multi-layer laminate having the inner surface, wherein said substrate forms a fold over itself, such that said inner surface forms a first inner side and a second inner side on opposite sides of the interior of said cell;
the first electrochemical layer is on at least one of said first inner side and said second inner side of said substrate;
the second electrochemical layer is on at least one of said first inner side and said second inner side of said substrate and coplanar with said first electrochemical layer; and
the cell further comprising at least one sealing layer, wherein
said substrate and said at least one sealing layer form said pouch for substantially enclosing all of said layers within said pouch.

42. The battery of claim 1, further comprising:
a printed collector covering a first portion of said inner surface, said collector having a primary portion, and an extension portion extending toward an edge of said inner surface;
a printed metallic contact partially covering said extension portion of said collector;
a printed heat-sensitive adhesive partially covering said inner surface and partially covering said collector;
wherein the first electrochemical layer is a printed first electrode covering at least a portion of said primary portion of said collector;
wherein the second electrochemical layer is a second electrode covering a second portion of said inner surface and adjacent to said collector, and having a primary portion and an extension portion extending toward said edge of said inner surface;
wherein the electrolyte layer substantially covers said first electrode and substantially covers said second electrode primary portion;

wherein the covering layer has an inner surface covering all of said collector, said first electrode, said second electrode primary portion, said electrolyte layer, and said substrate, said covering layer having a first contact hole for providing access to said contact and also having a second contact hole for providing access to said extension portion of said second electrode, wherein a part of said covering layer is sealed to a part of said inner surface using said adhesive, said covering layer also being sealed over said collector extension portion and said second electrode extension portion thereby forming the sealed pouch, and wherein said first contact hole provides electrical access to said first electrode and said second contact hole provides electrical access to said second electrode.

43. The battery of claim 42, wherein said plurality of laminated layers includes a structural layer comprising said oxide coated moisture barrier layer and/or a heat sealing layer.

44. The battery of claim 42, wherein said plurality of laminated layers includes:
an inner layer including a polymer film and/or a heat sealing coating;
said oxide coated moisture barrier layer;
a first adhesive layer for connecting said inner layer to said oxide coated moisture barrier layer;
an outer structural layer including an orientated polyester; and
a second adhesive layer for connecting said oxide coated moisture barrier layer to said outer structural layer.

45. The battery of claim 44, wherein said covering layer sealed over said collector extension portion and said second electrode extension portion is sealed by means of heat on a perimeter of said cell as well as around the contact holes by means of the heat seal layer of the laminated substrate.

46. The battery of claim 42, wherein said plurality of laminated layers includes the oxide coated moisture barrier layer.

47. The battery of claim 42, wherein said collector is a highly conductive ink including carbon, and having a resistivity of less than 50 ohms per square per mil.

48. The battery of claim 47, wherein said ink used for said first electrode has a weight composition of about 20-60% EMD K60MnO2, 5-25% KS6 Graphite, 0.1-0.70% hydroxylethyl cellulose in 0.05-3% aqueous solution, and with a total of 30-50% water.

49. The battery of claim 42, wherein said second electrode includes an at least 95% pure zinc foil that is laminated to the substrate.

50. The battery of claim 42, wherein the separator/electrolyte includes a starch coated Kraft paper and about 23-32% (weight) aqueous solution of zinc chloride with about 0-0.8% (weight) of carboxymethylcellulose (CMC).

51. The battery of claim 42, wherein the separator/electrolyte includes a starch coated Kraft paper and an about 23-32% (weight) aqueous solution of zinc acetate with about 0-0.8% (weight) of carboxymethylcellulose (CMC).

52. The battery of claim 42, wherein the separator/electrolyte includes an about 23-32% (weight) aqueous solution of zinc chloride with about 0.0-0.8% (weight) of carboxymethylcellulose (CMC).

53. The battery of claim 42, wherein said covering layer sealed over said collector extension portion and said second electrode extension portion is sealed by means of a printable heat sensitive adhesive and/or a pressure sensitive adhesive.

54. The battery of claim 42, wherein said covering layer sealed over said collector extension portion and said second electrode extension portion is sealed by means of a printable heat sensitive adhesive and/or a pressure sensitive adhesive in a full or partial picture frame pattern.

55. The battery of claim 1, wherein:
the substrate is flexible and includes a non-conductive surface;
the first electrochemical layer is a cathode layer covering said non-conductive surface;
the second electrochemical layer is an anode layer covering said non-conductive surface, said anode layer being substantially coplanar with, and adjacent to, said cathode;
the electrolyte layer covers at least a portion of said anode and also covers at least a portion of said cathode, and
the cell further comprising at least one sealing layer, wherein said flexible substrate is comprised of a sheet of material folded over itself to form said sealing layer, and wherein said substrate and said at least one sealing layer form said pouch for substantially enclosing all of said layers within said pouch.

56. The battery of claim 55, wherein one or both of said cathode layer and said anode layer includes an ink.

57. The battery of claim 55, further comprising a collector layer between said non-conductive surface and one of said cathode and said anode.

58. The battery of claim 57, wherein one or more of said cathode layer, said anode layer, and said collector layer includes an ink.

59. The battery of claim 58, wherein said substrate includes a contact opening for providing electrical access to at least one of said cathode and said anode.

60. The battery of claim 58, wherein said ink includes a polymer binder having one or more of polyvinylpyrrolidone, polyvinyl alcohol, a starch, a modified starch, ethyl cellulose, hydroxy-ethyl cellulose; methyl cellulose, polyethylene oxide, polyacryamide, and Teflon.

61. The battery of claim 57, wherein at least one of said cathode layer and said anode layer includes a first ink, and wherein said collector layer includes a second ink having a conductivity higher than said first ink.

62. The battery of claim 61, wherein said substrate includes a first contact hole therethrough and a second contact hole therethrough for providing electrical access to said cathode and said anode, respectively.

63. The battery of claim 61, wherein said first ink includes a polymer binder containing hydroxy-ethyl cellulose.

64. The battery of claim 1, wherein said substrate includes a first contact hole therethrough and a second contact hole therethrough for providing electrical access to said first and second electrochemical layers, respectively, and both of the first and second contact holes are located on a major surface of the substrate.

65. The battery of claim 64, wherein said first and second contact holes include at least one open side.

66. The battery of claim 1, wherein said substrate is comprised of a sheet of material folded over itself to form said covering layer, and wherein said inner surface is bound to itself to form said pouch.

* * * * *

UNITED STATES PATENT AND TRADEMARK OFFICE
CERTIFICATE OF CORRECTION

PATENT NO.        : 8,722,235 B2
APPLICATION NO.   : 11/110202
DATED             : May 13, 2014
INVENTOR(S)       : Gary R. Tucholski et al.

Page 1 of 1

It is certified that error appears in the above-identified patent and that said Letters Patent is hereby corrected as shown below:

In the Specification

Column 12, line 49, please delete "50" and add -- 40 --

Column 15, line 53, please delete "50" and add -- 40 --

Column 15, line 63, please delete "50" and add -- 40 --

Column 16, line 43, please delete "50" and add -- 40 --

Column 16, line 50, please delete "50" and add -- 40 --

Column 17, line 7, please delete "50" and add -- 40 --

Column 17, line 12, please delete "50" and add -- 40 --

Column 17, line 14, please delete "50" and add -- 40 --

Signed and Sealed this
Fifth Day of August, 2014

Michelle K. Lee
*Deputy Director of the United States Patent and Trademark Office*